United States Patent
Jin et al.

(10) Patent No.: US 10,802,957 B2
(45) Date of Patent: Oct. 13, 2020

(54) CONTROL MODULES, MULTI-LEVEL DATA STORAGE DEVICES, MULTI-LEVEL DATA STORAGE METHODS, AND COMPUTER READABLE MEDIA

(71) Applicant: AGENCY FOR SCIENCE, TECHNOLOGY AND RESEARCH, Singapore (SG)

(72) Inventors: Chao Jin, Singapore (SG); Weiya Xi, Singapore (SG); Khai Leong Yong, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 56 days.

(21) Appl. No.: 16/087,623

(22) PCT Filed: Mar. 15, 2017

(86) PCT No.: PCT/SG2017/050128
§ 371 (c)(1),
(2) Date: Sep. 21, 2018

(87) PCT Pub. No.: WO2017/164809
PCT Pub. Date: Sep. 28, 2017

(65) Prior Publication Data
US 2019/0102288 A1 Apr. 4, 2019

(30) Foreign Application Priority Data
Mar. 23, 2016 (SG) .............................. 10201602294V

(51) Int. Cl.
*G06F 12/02* (2006.01)
*G06F 3/06* (2006.01)
(Continued)

(52) U.S. Cl.
CPC ........ *G06F 12/0238* (2013.01); *G06F 3/0611* (2013.01); *G06F 3/0647* (2013.01);
(Continued)

(58) Field of Classification Search
CPC combination set(s) only.
See application file for complete search history.

(56) References Cited

U.S. PATENT DOCUMENTS 8,315,995 B1 11/2012 Levy
9,116,914 B1 8/2015 Muthirisavenugopal et al.
(Continued)

OTHER PUBLICATIONS

PCT International Search Report for PCT Counterpart Application No. PCT/SG2017/050128, 3 pgs. (dated Jun. 6, 2017).
(Continued)

*Primary Examiner* — Yong J Choe
(74) *Attorney, Agent, or Firm* — Womble Bond Dickinson (US) LLP

(57) ABSTRACT

A control module for a multi-level data storage device having a plurality of memory devices is disclosed. The control module may include: an access determination circuit configured to determine that access has been made to a piece of data stored on at least one of the plurality of memory devices, the piece of data associated with a level being one of a first level, a second level, or a third level; a level management circuit configured to change the level from the third level to the second level or from the second level to the first level upon determining that access has been made to the piece of data; and a memory controller configured to promote the piece of data in response to whether the level is the first level, the second level or the third level, wherein at least two levels of the first level, the second level, and the third level are associated with one of the plurality of memory devices.

16 Claims, 19 Drawing Sheets

(51) Int. Cl.
  *G06F 16/185* (2019.01)
  *G06F 12/0864* (2016.01)
(52) U.S. Cl.
  CPC ........ *G06F 3/0685* (2013.01); *G06F 12/0864* (2013.01); *G06F 16/185* (2019.01); *G06F 2212/222* (2013.01); *G06F 2212/261* (2013.01); *G06F 2212/7207* (2013.01)

(56) References Cited

U.S. PATENT DOCUMENTS

2015/0205528 A1   7/2015   Hyde, II et al.
2015/0355837 A1   12/2015  Bish et al.

OTHER PUBLICATIONS

PCT Written Opinion of the International Searching Authority for PCT Counterpart Application No. PCT/SG2017/050128, pp. 6 pgs. (dated Jun. 6, 2017).

PCT International Preliminary Report on Patentability for PCT Counterpart Application No. PCT/SG2017/050128, 16 pgs. (dated Dec. 29, 2017).

Y Cheng, et al., "AMC: an adaptive multi-level cache algorithm in hybrid storage systems," Concurrency and Computation: Practice and Experience, vol. 27, No. 16, pp. 4230-4246 (May 28, 2015).

CONTROL MODULES, MULTI-LEVEL DATA STORAGE DEVICES, MULTI-LEVEL DATA STORAGE METHODS, AND COMPUTER READABLE MEDIA

CROSS-REFERENCE TO RELATED APPLICATIONS

This patent application is a U.S. National Phase Application under 35 U.S.C. § 371 of International Application No. PCT/SG2017/050128, filed on 15 Mar. 2017, entitled CONTROL MODULES, MULTI-LEVEL DATA STORAGE DEVICES, MULTI-LEVEL DATA STORAGE METHODS, AND COMPUTER READABLE MEDIA, which claims priority to Singapore patent application No. 10201602294V, filed on 23 Mar. 2016.

TECHNICAL FIELD

The following discloses a control modules, multi-level data storage devices, multi-level data storage methods, and computer readable media.

BACKGROUND ART

Storage architectures and systems are evolving rapidly, due to the advancement of storage hardware and software techniques. Thus, there may be a need to make use of this advanced technology for efficient devices.

Furthermore, other desirable features and characteristics will become apparent from the subsequent detailed description and the appended claims, taken in conjunction with the accompanying drawings and this background of the disclosure.

SUMMARY OF INVENTION

According to an aspect of the invention, a control module for a multi-level data storage device having a plurality of memory devices is disclosed. The control module may include: an access determination circuit configured to determine that access has been made to a piece of data stored on at least one of the plurality of memory devices, the piece of data associated with a level being (or including or being included in) one of a first level, a second level, or a third level; a level management circuit configured to change the level from the third level to the second level or from the second level to the first level upon determining that access has been made to the piece of data; and a memory controller configured to promote the piece of data in response to whether the level is (or includes or is included in) the first level, the second level or the third level, wherein at least two levels of the first level, the second level, and the third level are associated with one of the plurality of memory devices.

According to various embodiments, a first memory device of the plurality of memory devices may be associated with the first level; and a second memory device of the plurality of memory devices is associated with the second level and the third level.

According to various embodiments, a first memory device of the plurality of memory devices may be associated with the first level and the second level; and a second memory device of the plurality of memory devices may be associated with the third level.

According to various embodiments, the memory controller may be configured to delete the piece of data from a previous storage location after promoting the piece of data.

According to various embodiments, the memory controller may be configured to maintain storing the piece of data on a previous storage location after promoting the piece of data.

According to various embodiments, the memory controller may be configured to demote the piece of data if a number of other pieces of data associated with the same level as the piece of data is higher than a pre-determined threshold.

According to various embodiments, demoting the piece of data may include or may be or may be included in changing the level that the piece of data is associated with to a pre-determined level.

According to various embodiments, the memory controller may be configured to delete the piece of data from a previous storage location after demoting the piece of data.

According to various embodiments, each memory device of the plurality of memory devices may be associated with a plurality of levels.

According to various embodiments, each level of the plurality of levels may be associated with only one memory device.

According to various embodiments, the control module may further include a level reconstruction circuit configured to reconstruct the level to which the piece of data is associated after loss of information on the level to which the piece of data is associated.

According to various embodiments, the level reconstruction circuit may be configured to reconstruct the level based on metadata associated with the file.

According to various embodiments, a (for example non-transitory) computer readable medium may be provided. The computer readable medium may include instructions which, when executed by a processor, make the processor perform a multi-level data storage method. The multi-level data storage method may include: determining that access has been made to a piece of data stored on at least one of a plurality of memory devices, the piece of data associated with a level being (or including or being included in) one of a first level, a second level, or a third level; changing the level from the third level to the second level or from the second level to the first level upon determining that access has been made to the piece of data; and promoting the piece of data in response to whether the level is (or includes or is included in) the first level, the second level or the third level, wherein at least two levels of the first level, the second level, and the third level are associated with one of the plurality of memory devices.

According to various embodiments, the computer readable medium may further include instructions which, when executed by a processor, make the processor perform reconstructing the level to which the piece of data is associated after loss of information on the level to which the piece of data is associated.

According to various embodiments, the computer readable medium may further include instructions which, when executed by a processor, make the processor perform reconstructing the level based on metadata associated with the file.

According to various embodiments, a multi-level data storage device may be provided. The multi-level data storage device may include: a plurality of memory devices; an access determination circuit configured to determine that access has been made to a piece of data stored on at least one of the plurality of memory devices, the piece of data associated with a level being (or including or being included in) one of a first level, a second level, or a third level; a level management circuit configured to change the level from the third level to the second level or from the second level to the first level upon determining that access has been made to the piece of data; and a memory controller configured to promote the piece of data in response to whether the level is (or includes or is included in) the first level, the second level or the third level, wherein at least two levels of the first level, the second level, and the third level are associated with one of the plurality of memory devices.

According to various embodiments, the plurality of memory devices may include memory devices of different speed.

According to various embodiments, promoting the piece of data may include or may be or may be included in storing the piece of data on a faster memory device.

According to various embodiments, the plurality of memory devices may include or may be a hard disk drive, a solid-state drive and a non-volatile random access memory.

According to various embodiments, promoting the piece of data may include or may be or may be included in copying the piece of data from the hard disk drive to the solid-state drive or copying the piece of data from the solid-state drive to the non-volatile random access memory.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments, by way of example only, and to explain various principles and advantages in accordance with a present embodiment.

Figure 1A:
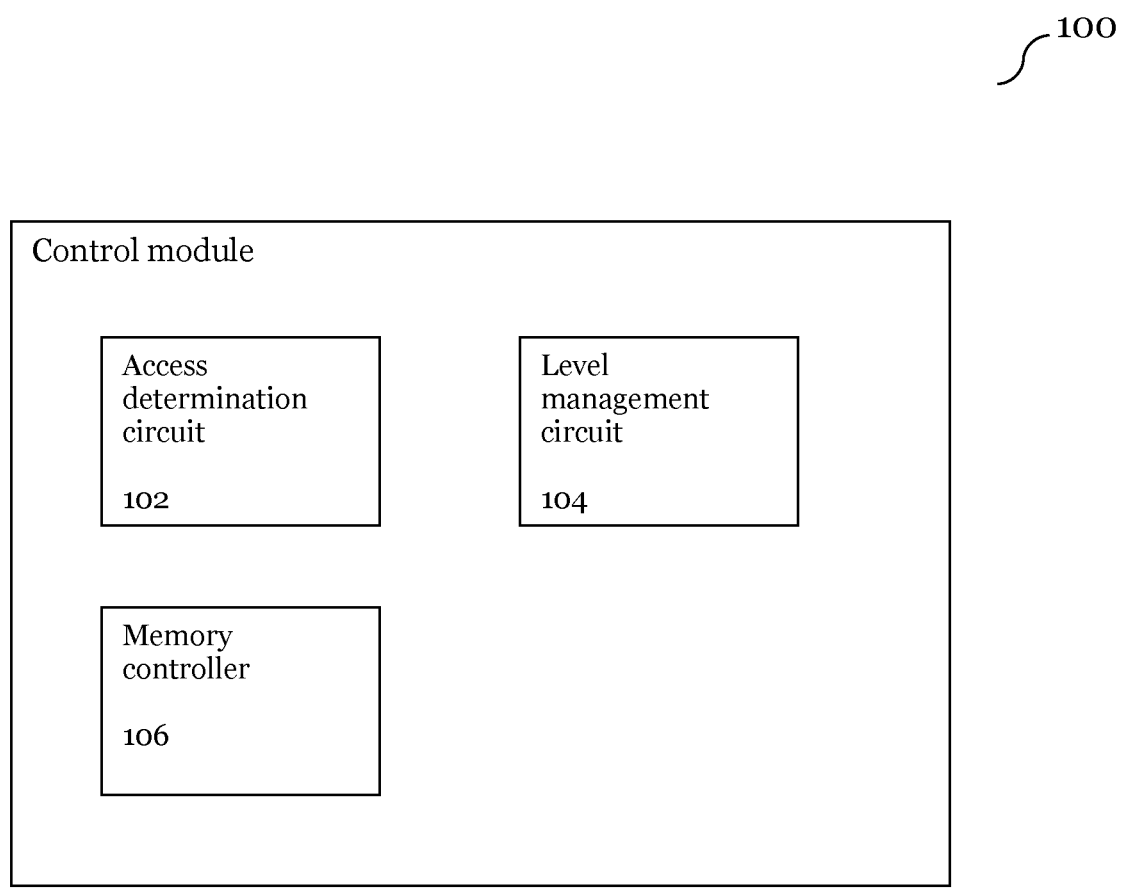
FIG. 1A shows a control module in accordance with an embodiment of the invention.

Skilled artisans will appreciate that elements in the figures are illustrated for simplicity and clarity and have not necessarily been depicted to scale. For example, the dimensions of some of the elements in the block diagrams or steps in the flowcharts may be exaggerated in respect to other elements to help improve understanding of the present embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the preferred embodiments to disclose a method and system which is able to allow efficient storage of data, for example on a data storage device with memories (or memory devices) of different speeds. Data which in a present operation stage is used frequently (such data may be referred to as "hot" data) may be stored on a fast storage (or storage area), whereas less frequently used data (which may be referred to as "colder" (or "cold") data or "less hot" data) may be stored on a slower storage (or storage area).

According to various embodiments, a memory device as used herein may be understood as to be a device or apparatus or medium or any other suitable material for storing data, or any portion thereof. As such, it will be understood that one physical device may include one or more storage devices as used herein.

According to various embodiments, access may be understood as reading or writing a file or metadata of the file or object or metadata of the object.

According to various embodiments, a level may be understood as an identifier or a classifier of different sets of data. It will be understood that a plurality of pieces of data of one class may or may not be provided in physical proximity to each other on a memory device. According to various embodiments, a first level may also be denoted as "level 0", in line with a common way of addressing data objects in arrays starting with identifier "0". Regions referred to as "Count=X" region may also be understood as levels.

According to various embodiments, "promoting" or "promote" may be understood as enhancing accessibility of a piece of data. This may for example be done by moving the piece of data to a different memory device, or by associating the piece of data to a level in which data is closer to being moved or copied to a different memory device. Likewise, "demoting" or "demote" or "destaging" may be understood as the opposite of "promoting".

According to various embodiments, "a piece of data associated with a level" may be understood as the piece of data "having" the level; for example, information indicating the level may be stored in relation to the piece of data (this may or may not include that the information on the level and the piece of data are stored in physical proximity to each other on a memory device). According to various embodiments, "a level associated with a storage device" may be understood as the storage device storing pieces of data to which the level is associated. For example, if data A is associated with a first level, data B is associated with a second level, data C is associated with a third level, the first level and the second level are associated with a first memory device, and the third level is associated with a second memory device, then data A and data B are to be stored on the first memory device, and data C is to be stored on the second memory device.

Storage architectures and systems are evolving rapidly, due to the advancement of storage hardware and software techniques. From the hardware aspects, massive adoption of solid-state drives is significantly redefining the performance and behavior of storage systems. Recent achievements of non-volatile memory technologies, such as phase-change memory (PCRAM) and spin-transfer torque memory (STTRAM), are bringing the storage systems to a next level with close to DRAM (dynamic random-access memory) speed. From the software aspects, many system software techniques are developed to build high performance, highly reliable and scalable storage systems. In a single storage node, new device drivers, file systems, and other operating system components are developed to better integrate SSD (solid-state drive) and NVRAM (non-volatile random access memory) into storage system architecture. In a distributed storage system, new cluster software such as Ceph and GlusterFS (wherein FS may stand for file system), and new storage interfaces such as object, REST (Representational state transfer), and key-value are developed to better meet various user requirements.

The Active Drive cluster may be a storage system hardware and software architecture. A traditional drive is usually "dumb" and can only be accessed through low-level SATA (Serial AT Attachment) or SCSI (Small Computer System Interface) protocol. It needs to be attached to a storage server which provides the software to manage the drives and organize them into a storage system. On the other hand, an Active Drive may be a smart drive which integrates the storage system software into the drive, and thus it may directly be attached to the network and formulate a storage cluster with other Active Drives. In this way, the Active Drive storage cluster may completely eliminate the intermediate storage server components, increase the storage rack density and reduce the total cost of ownership.

Not like a traditional drive, an Active Drive may be a hybrid storage device with multiple different types of storage media inside one drive enclosure, such as magnetic disks, flash memory, and non-volatile memory. An Active Drive may also be built with an Active Controller Board attached with hard drives, SSDs, and NVRAM devices. In an hardware architecture, an Active Drive may implement a cache management software to efficiently manage the hybrid storage resources inside the drive.

According to various embodiments, a cache management method for the hybrid active storage devices may be provided. According to various embodiments, a cache management architecture for the hybrid active storage devices may be provided. According to various embodiments, a multi-level cache architecture and methods for the hybrid active storage devices may be provided.

According to various embodiments, storage systems, for example a multi-level cache architecture, and methods for hybrid storage devices may be provided.

FIG. 1A illustrates a control module 100 for a multi-level data storage device having a plurality of memory devices in accordance with an embodiment of the invention. The control module 100 may include an access determination circuit 102 configured to determine that access has been made to a piece of data stored on at least one of the plurality of memory devices. The piece of data may be associated with a level being one of a first level, a second level, or a third level. The control module 100 may further include a level management circuit 104 configured to change the level from the third level to the second level or from the second level to the first level upon determining that access has been made to the piece of data. The control module 100 may further include a memory controller 106 configured to promote the piece of data in response to whether the level is (or includes) the first level, the second level or the third level, wherein at least two levels of the first level, the second level, and the third level are associated with one of the plurality of memory devices.

In other words, a control module may be provided for controlling a plurality of memory devices, in which data is promoted from one memory device to another memory device only after having been promoted internally (in other words: after having been promoted to higher levels inside the one memory device).

According to various embodiments, promoting the piece of data may include or may be or may be included in effecting storing the piece of data on one of the plurality of memory devices.

According to various embodiments, promoting the piece of data may include or may be or may be included in effecting storing the piece of data on the memory device of the plurality of memory devices associated with the level with which the piece of data is associated.

According to various embodiments, the memory controller 106 may be configured to promote the piece of data if a changed level with which the piece of data is associated is associated with a memory device of the plurality of memory devices which is different from a memory device of the plurality of memory devices to which the level before the change of the level is associated.

According to various embodiments, the memory controller 106 may be further configured to keep the piece of data on an unchanged storage location of the plurality of memory devices, if a changed level with which the piece of data is associated is associated with a memory device of the plurality of memory devices which is identical to a memory device of the plurality of memory devices to which the level before the change of the level is associated.

According to various embodiments, a first memory device of the plurality of memory devices may be associated with the first level; and a second memory device of the plurality of memory devices may be associated with the second level and the third level.

According to various embodiments, a first memory device of the plurality of memory devices may be associated with the first level and the second level; and a second memory device of the plurality of memory devices may be associated with the third level.

According to various embodiments, the memory controller 106 may be configured to delete the piece of data from a previous storage location after promoting the piece of data.

According to various embodiments, the memory controller 106 may be configured to maintain storing the piece of data on a previous storage location after promoting the piece of data.

According to various embodiments, the memory controller 106 may be configured to demote the piece of data if a number of other pieces of data associated with the same level as the piece of data is higher than a pre-determined threshold.

According to various embodiments, demoting the piece of data may include or may be or may be included in changing the level that the piece of data is associated with to a pre-determined level.

According to various embodiments, the pre-determined level may include or may be or may be included in a level one level higher than the previous level.

According to various embodiments, the pre-determined level may include or may be or may be included in a highest level associated with another memory device.

According to various embodiments, demoting the piece of data may include or may be or may be included in effecting storing the piece of data on one of the plurality of memory devices.

According to various embodiments, demoting the piece of data may include or may be or may be included in effecting storing the piece of data on the memory device of the plurality of memory devices associated with the level with which the piece of data is associated.

According to various embodiments, the memory controller 106 may be configured to delete the piece of data from a previous storage location after demoting the piece of data.

According to various embodiments, each memory device of the plurality of memory devices may be associated with a plurality of levels.

According to various embodiments, each level of the plurality of levels may be associated with only one memory device.

According to various embodiments, the plurality of memory devices may include or may be or may be included in memory devices of different speed.

According to various embodiments, promoting the piece of data may include or may be or may be included in storing the piece of data on a faster memory device.

According to various embodiments, the plurality of memory devices may include or may be or may be included in memory devices of different size.

According to various embodiments, promoting the piece of data may include or may be or may be included in storing the piece of data on a smaller memory device.

According to various embodiments, the plurality of memory devices may include or may be or may be included in memory devices of different cost.

According to various embodiments, promoting the piece of data may include or may be or may be included in storing the piece of data on a more expensive memory device.

According to various embodiments, the plurality of memory devices may include or may be or may be included in at least three memory devices.

According to various embodiments, the plurality of memory devices may include or may be or may be included in a hard disk drive, a solid-state drive and a non-volatile random access memory.

According to various embodiments, promoting the piece of data may include or may be or may be included in copying the piece of data from the hard disk drive to the solid-state drive or copying the piece of data from the solid-state drive to the non-volatile random access memory.

According to various embodiments, the plurality of memory devices may include or may be or may be included in a plurality of zones of a hard disk drive.

According to various embodiments, the memory controller 106 may further be configured to promote the piece of data further based on a data type of the piece of data.

According to various embodiments, data in at least one of plurality of memory devices may be managed according to a first-in-first-out scheme.

According to various embodiments, data in at least one of plurality of memory devices may be managed according to a least-recently-used scheme.

According to various embodiments, the piece of data may correspond to at least one of a file or an object (for example in an objected storage device (OSD or OBSD) or a hybrid OSD (HOSD)).

According to various embodiments, the piece of data may correspond to a portion of at least one of a file or an object.

Figure 1B:
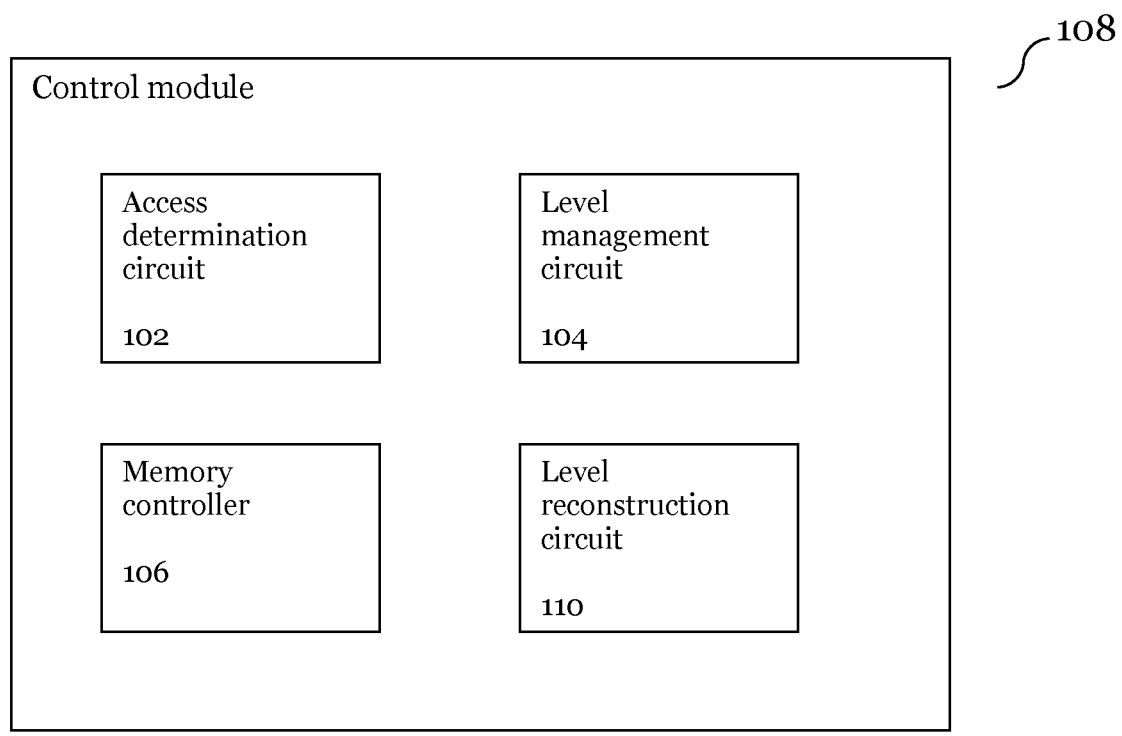
FIG. 1B shows a control module in accordance with an embodiment of the invention.

FIG. 1B illustrates a control module 108 for a multi-level data storage device having a plurality of memory devices in accordance with an embodiment of the invention. The control module 108 may, similar to the control module 100 of FIG. 1A, include an access determination circuit 102 configured to determine that access has been made to a piece of data stored on at least one of the plurality of memory devices. The piece of data may be associated with a level being one of a first level, a second level, or a third level. The control module 108 may, similar to the control module 100 of FIG. 1A, further include a level management circuit 104 configured to change the level from the third level to the second level or from the second level to the first level upon determining that access has been made to the piece of data. The control module 108 may, similar to the control module 100 of FIG. 1A, further include a memory controller 106 configured to promote the piece of data in response to whether the level is (or includes) the first level, the second level or the third level, wherein at least two levels of the first level, the second level, and the third level are associated with one of the plurality of memory devices. The control module 108 may further include a level reconstruction circuit 110 configured to reconstruct the level to which the piece of data is associated after loss of information on the level to which the piece of data is associated.

According to various embodiments, the level reconstruction circuit 110 may be is configured to reconstruct the level based on metadata associated with the file.

Figure 1C:
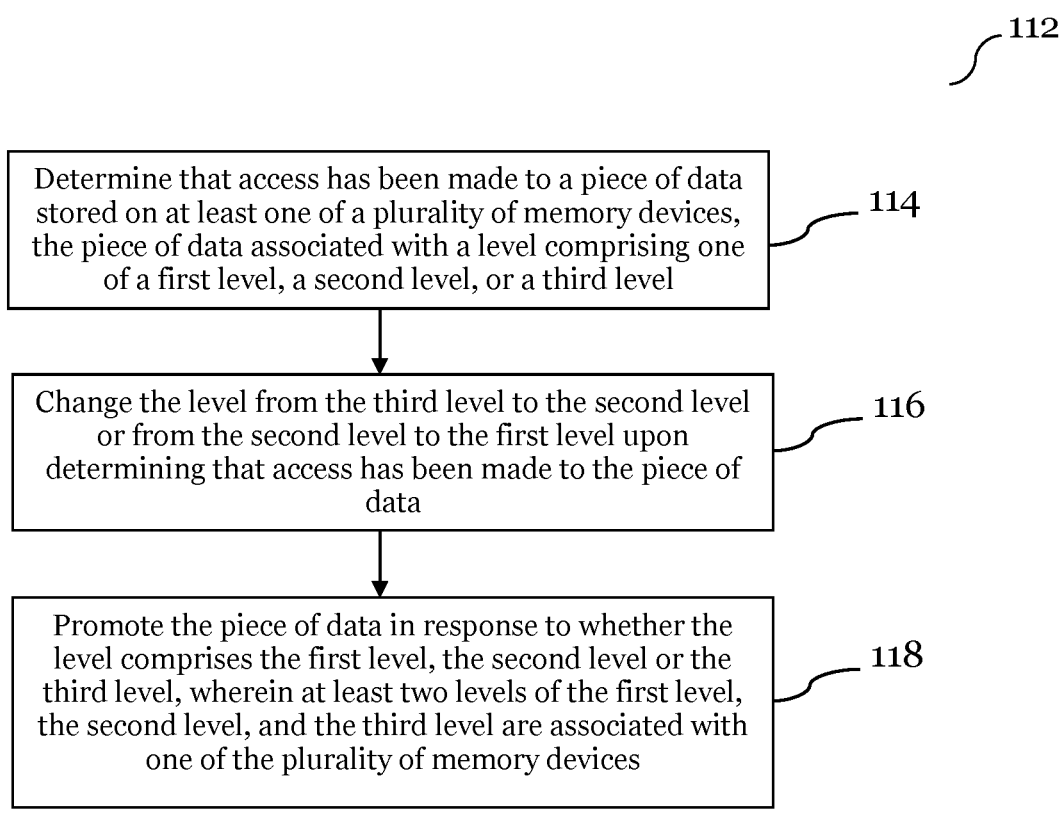
FIG. 1C shows a flow diagram illustrating a multi-level data storage method in accordance with an embodiment of the invention.

FIG. 1C shows a flow diagram 112 illustrating a multi-level data storage method in accordance with an embodiment of the invention. In 114, it may be determined that access has been made to a piece of data stored on at least one of a plurality of memory devices, the piece of data associated with a level being (or including or being included in) one of a first level, a second level, or a third level. In 116, the level may be changed from the third level to the second level or from the second level to the first level upon determining that access has been made to the piece of data. In 118, the piece of data may be promoted in response to whether the level is (or includes or is included in) the first level, the second level or the third level, wherein at least two levels of the first level, the second level, and the third level are associated with one of the plurality of memory devices.

According to various embodiments, promoting the piece of data may include or may be or may be included in effecting storing the piece of data on one of the plurality of memory devices.

According to various embodiments, promoting the piece of data may include or may be or may be included in effecting storing the piece of data on the memory device of the plurality of memory devices associated with the level with which the piece of data is associated.

According to various embodiments, the multi-level data storage method may further include promoting the piece of data if a changed level with which the piece of data is associated is associated with a memory device of the plurality of memory devices which is different from a memory device of the plurality of memory devices to which the level before the change of the level is associated.

According to various embodiments, the multi-level data storage method may further include keeping the piece of data on an unchanged storage location of the plurality of memory devices, if a changed level with which the piece of data is associated is associated with a memory device of the plurality of memory devices which is identical to a memory device of the plurality of memory devices to which the level before the change of the level is associated.

According to various embodiments, the first memory device of the plurality of memory devices may be associated with the first level; and the second memory device of the plurality of memory devices may be associated with the second level and the third level.

According to various embodiments, the first memory device of the plurality of memory devices may be associated with the first level and the second level; and the second memory device of the plurality of memory devices may be associated with the third level.

According to various embodiments, the multi-level data storage method may further include deleting the piece of data from a previous storage location after promoting the piece of data.

According to various embodiments, the multi-level data storage method may further include maintaining storing the piece of data on a previous storage location after promoting the piece of data.

According to various embodiments, the multi-level data storage method may further include demoting the piece of data if a number of other pieces of data associated with the same level as the piece of data is higher than a pre-determined threshold.

According to various embodiments, demoting the piece of data may include or may be or may be included in changing the level that the piece of data is associated with to a pre-determined level.

According to various embodiments, the pre-determined level may include or may be or may be included in a level one level higher than the previous level.

According to various embodiments, the pre-determined level may include or may be or may be included in a highest level associated with another memory device.

According to various embodiments, demoting the piece of data may include or may be or may be included in effecting storing the piece of data on one of the plurality of memory devices.

According to various embodiments, demoting the piece of data may include or may be or may be included in effecting storing the piece of data on the memory device of the plurality of memory devices associated with the level with which the piece of data is associated.

According to various embodiments, the multi-level data storage method may further include deleting the piece of data from a previous storage location after demoting the piece of data.

According to various embodiments, each memory device of the plurality of memory devices may be associated with a plurality of levels.

According to various embodiments, each level of the plurality of levels may be associated with only one memory device.

According to various embodiments, the plurality of memory devices may include or may be or may be included in memory devices of different speed.

According to various embodiments, promoting the piece of data may include or may be or may be included in storing the piece of data on a faster memory device.

According to various embodiments, the plurality of memory devices may include or may be or may be included in memory devices of different size.

According to various embodiments, promoting the piece of data may include or may be or may be included in storing the piece of data on a smaller memory device.

According to various embodiments, the plurality of memory devices may include or may be or may be included in memory devices of different cost.

According to various embodiments, promoting the piece of data may include or may be or may be included in storing the piece of data on a more expensive memory device.

According to various embodiments, the plurality of memory devices may include or may be or may be included in at least three memory devices.

According to various embodiments, the plurality of memory devices may include or may be or may be included in a hard disk drive, a solid-state drive and a non-volatile random access memory.

According to various embodiments, promoting the piece of data may include or may be or may be included in copying the piece of data from the hard disk drive to the solid-state drive or copying the piece of data from the solid-state drive to the non-volatile random access memory.

According to various embodiments, the plurality of memory devices may include or may be or may be included in a plurality of zones of a hard disk drive.

According to various embodiments, the multi-level data storage method may further include promoting the piece of data further based on a data type of the piece of data.

According to various embodiments, data in at least one of plurality of memory devices may be managed according to a first-in-first-out scheme.

According to various embodiments, data in at least one of plurality of memory devices may be managed according to a least-recently-used scheme.

According to various embodiments, the piece of data may correspond to at least one of a file or an object.

According to various embodiments, the piece of data may correspond to a portion of at least one of a file or an object.

According to various embodiments, the multi-level data storage method may further include reconstructing the level to which the piece of data is associated after loss of information on the level to which the piece of data is associated.

According to various embodiments, the multi-level data storage method may further include reconstructing the level based on metadata associated with the file.

According to various embodiments, a computer readable medium may be provided. The computer readable medium may include instructions which, when executed by a processor, make the processor perform a multi-level data storage method. The multi-level data storage method may include: determining that access has been made to a piece of data stored on at least one of a plurality of memory devices, the piece of data associated with a level being (or including or being included in) one of a first level, a second level, or a third level; changing the level from the third level to the second level or from the second level to the first level upon determining that access has been made to the piece of data; and promoting the piece of data in response to whether the level is (or includes or is included in) the first level, the second level or the third level, wherein at least two levels of the first level, the second level, and the third level are associated with one of the plurality of memory devices.

According to various embodiments, promoting the piece of data may include or may be or may be included in effecting storing the piece of data on one of the plurality of memory devices.

According to various embodiments, promoting the piece of data may include or may be or may be included in effecting storing the piece of data on the memory device of the plurality of memory devices associated with the level with which the piece of data is associated.

According to various embodiments, the computer readable medium may further include instructions which, when executed by a processor, make the processor perform promoting the piece of data if a changed level with which the piece of data is associated is associated with a memory device of the plurality of memory devices which is different from a memory device of the plurality of memory devices to which the level before the change of the level is associated.

According to various embodiments, the computer readable medium may further include instructions which, when executed by a processor, make the processor perform keeping the piece of data on an unchanged storage location of the plurality of memory devices, if a changed level with which the piece of data is associated is associated with a memory device of the plurality of memory devices which is identical to a memory device of the plurality of memory devices to which the level before the change of the level is associated.

According to various embodiments, the first memory device of the plurality of memory devices may be associated with the first level; and the second memory device of the plurality of memory devices may be associated with the second level and the third level.

According to various embodiments, the first memory device of the plurality of memory devices may be associated with the first level and the second level; and the second memory device of the plurality of memory devices may be associated with the third level.

According to various embodiments, the computer readable medium may further include instructions which, when executed by a processor, make the processor perform deleting the piece of data from a previous storage location after promoting the piece of data.

According to various embodiments, the computer readable medium may further include instructions which, when executed by a processor, make the processor perform maintaining storing the piece of data on a previous storage location after promoting the piece of data.

According to various embodiments, the computer readable medium may further include instructions which, when executed by a processor, make the processor perform demoting the piece of data if a number of other pieces of data associated with the same level as the piece of data is higher than a pre-determined threshold.

According to various embodiments, demoting the piece of data may include or may be or may be included in changing the level that the piece of data is associated with to a pre-determined level.

According to various embodiments, the pre-determined level may include or may be or may be included in a level one level higher than the previous level.

According to various embodiments, the pre-determined level may include or may be or may be included in a highest level associated with another memory device.

According to various embodiments, demoting the piece of data may include or may be or may be included in effecting storing the piece of data on one of the plurality of memory devices.

According to various embodiments, demoting the piece of data may include or may be or may be included in effecting storing the piece of data on the memory device of the plurality of memory devices associated with the level with which the piece of data is associated.

According to various embodiments, the computer readable medium may further include instructions which, when executed by a processor, make the processor perform deleting the piece of data from a previous storage location after demoting the piece of data.

According to various embodiments, each memory device of the plurality of memory devices may be associated with a plurality of levels.

According to various embodiments, each level of the plurality of levels may be associated with only one memory device.

According to various embodiments, the plurality of memory devices may include or may be or may be included in memory devices of different speed.

According to various embodiments, promoting the piece of data may include or may be or may be included in storing the piece of data on a faster memory device.

According to various embodiments, the plurality of memory devices may include or may be or may be included in memory devices of different size.

According to various embodiments, promoting the piece of data may include or may be or may be included in storing the piece of data on a smaller memory device.

According to various embodiments, the plurality of memory devices may include or may be or may be included in memory devices of different cost.

According to various embodiments, promoting the piece of data may include or may be or may be included in storing the piece of data on a more expensive memory device.

According to various embodiments, the plurality of memory devices may include or may be or may be included in at least three memory devices.

According to various embodiments, the plurality of memory devices may include or may be or may be included in a hard disk drive, a solid-state drive and a non-volatile random access memory.

According to various embodiments, promoting the piece of data may include or may be or may be included in copying the piece of data from the hard disk drive to the solid-state drive or copying the piece of data from the solid-state drive to the non-volatile random access memory.

According to various embodiments, the plurality of memory devices may include or may be or may be included in a plurality of zones of a hard disk drive.

According to various embodiments, the computer readable medium may further include instructions which, when executed by a processor, make the processor perform promoting the piece of data further based on a data type of the piece of data.

According to various embodiments, data in at least one of plurality of memory devices may be managed according to a first-in-first-out scheme.

According to various embodiments, data in at least one of plurality of memory devices may be managed according to a least-recently-used scheme.

According to various embodiments, the piece of data may correspond to at least one of a file or an object.

According to various embodiments, the piece of data may correspond to a portion of at least one of a file or an object.

According to various embodiments, the computer readable medium may further include instructions which, when executed by a processor, make the processor perform reconstructing the level to which the piece of data is associated after loss of information on the level to which the piece of data is associated.

According to various embodiments, the computer readable medium may further include instructions which, when executed by a processor, make the processor perform reconstructing the level based on metadata associated with the file.

Figure 1D:
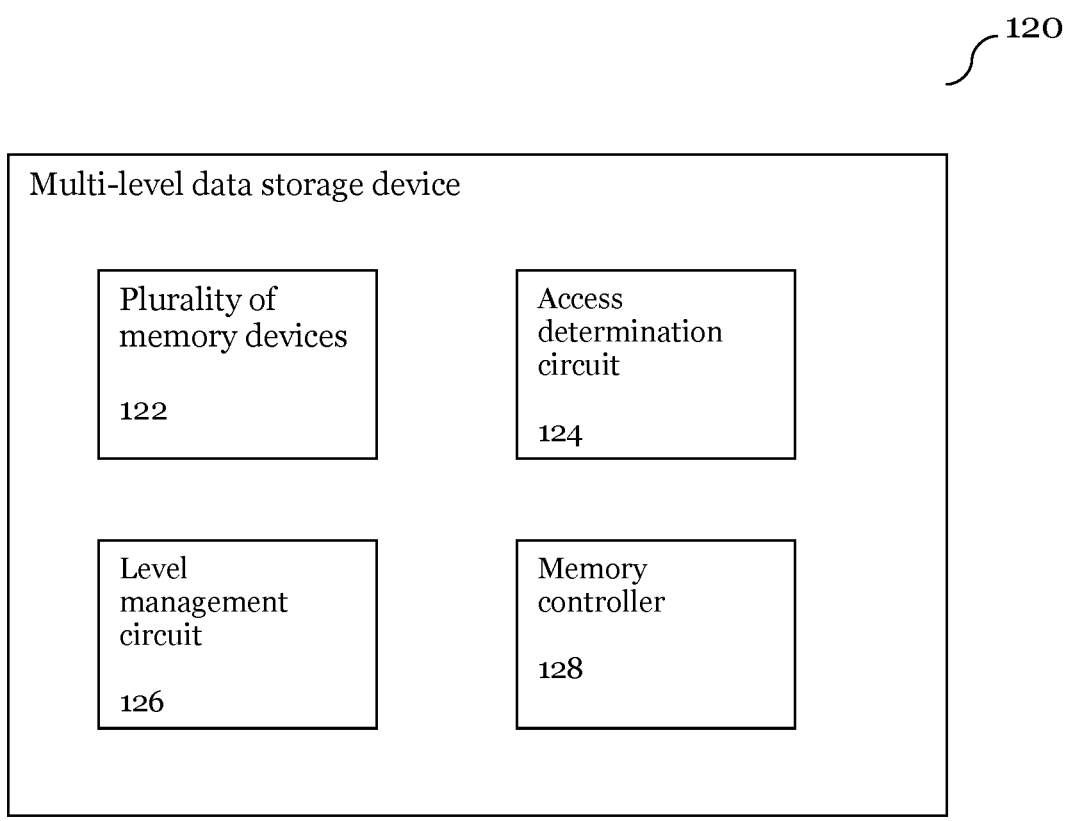
FIG. 1D shows a multi-level data storage device in accordance with an embodiment of the invention.

FIG. 1D illustrates a multi-level data storage device 120 in accordance with an embodiment of the invention. The multi-level data storage device 120 may include a plurality of memory devices 122. The multi-level data storage device 120 may further include an access determination circuit 124 configured to determine that access has been made to a piece of data stored on at least one of the plurality of memory devices 122. The piece of data may be associated with a level being (or including or being included in) one of a first level, a second level, or a third level. The multi-level data storage device 120 may further include a level management circuit 126 configured to change the level from the third level to the second level or from the second level to the first level upon determining that access has been made to the piece of data. The multi-level data storage device 120 may further include a memory controller 128 configured to promote the piece of data in response to whether the level is (or includes or is included in) the first level, the second level or the third level, wherein at least two levels of the first level, the second level, and the third level are associated with one of the plurality of memory devices 122.

According to various embodiments, promoting the piece of data may include or may be or may be included in effecting storing the piece of data on one of the plurality of memory devices 122.

According to various embodiments, promoting the piece of data may include or may be or may be included in effecting storing the piece of data on the memory device of the plurality of memory devices 122 associated with the level with which the piece of data is associated.

According to various embodiments, the memory controller 128 may be configured to promote the piece of data if a changed level with which the piece of data is associated is associated with a memory device of the plurality of memory devices 122 which is different from a memory device of the plurality of memory devices 122 to which the level before the change of the level is associated.

According to various embodiments, the memory controller 128 may further be configured to keep the piece of data on an unchanged storage location of the plurality of memory devices 122, if a changed level with which the piece of data is associated is associated with a memory device of the plurality of memory devices 122 which is identical to a memory device of the plurality of memory devices 122 to which the level before the change of the level is associated.

According to various embodiments, a first memory device of the plurality of memory devices 122 may be associated with the first level; and a second memory device of the plurality of memory devices 122 may be associated with the second level and the third level.

According to various embodiments, a first memory device of the plurality of memory devices 122 may be associated with the first level and the second level; and a second memory device of the plurality of memory devices 122 may be associated with the third level.

According to various embodiments, the memory controller 128 may be configured to delete the piece of data from a previous storage location after promoting the piece of data.

According to various embodiments, the memory controller 128 may be configured to maintain storing the piece of data on a previous storage location after promoting the piece of data.

According to various embodiments, the memory controller 128 may be configured to demote the piece of data if a number of other pieces of data associated with the same level as the piece of data is higher than a pre-determined threshold.

According to various embodiments, demoting the piece of data may include or may be or may be included in changing the level that the piece of data is associated with to a pre-determined level.

According to various embodiments, the pre-determined level may include or may be or may be included in a level one level higher than the previous level.

According to various embodiments, the pre-determined level may include or may be or may be included in a highest level associated with another memory device.

According to various embodiments, demoting the piece of data may include or may be or may be included in effecting storing the piece of data on one of the plurality of memory devices 122.

According to various embodiments, demoting the piece of data may include or may be or may be included in effecting storing the piece of data on the memory device of the plurality of memory devices 122 associated with the level with which the piece of data is associated.

According to various embodiments, the memory controller 128 may be configured to delete the piece of data from a previous storage location after demoting the piece of data.

According to various embodiments, each memory device of the plurality of memory devices 122 may be associated with a plurality of levels.

According to various embodiments, each level of the plurality of levels may be associated with only one memory device.

According to various embodiments, the plurality of memory devices 122 may include or may be or may be included in memory devices of different speed.

According to various embodiments, promoting the piece of data may include or may be or may be included in storing the piece of data on a faster memory device.

According to various embodiments, the plurality of memory devices 122 may include or may be or may be included in memory devices of different size.

According to various embodiments, promoting the piece of data may include or may be or may be included in storing the piece of data on a smaller memory device.

According to various embodiments, the plurality of memory devices 122 may include or may be or may be included in memory devices of different cost.

According to various embodiments, promoting the piece of data may include or may be or may be included in storing the piece of data on a more expensive memory device.

According to various embodiments, the plurality of memory devices 122 may include or may be or may be included in at least three memory devices.

According to various embodiments, the plurality of memory devices 122 may include or may be or may be included in a hard disk drive, a solid-state drive and a non-volatile random access memory.

According to various embodiments, promoting the piece of data may include or may be or may be included in copying the piece of data from the hard disk drive to the solid-state drive or copying the piece of data from the solid-state drive to the non-volatile random access memory.

According to various embodiments, the plurality of memory devices 122 may include or may be or may be included in a plurality of zones of a hard disk drive.

According to various embodiments, the memory controller 128 may be further configured to promote the piece of data further based on a data type of the piece of data.

According to various embodiments, data in at least one of plurality of memory devices 122 may be managed according to a first-in-first-out scheme.

According to various embodiments, data in at least one of plurality of memory devices 122 may be managed according to a least-recently-used scheme.

According to various embodiments, the piece of data may correspond to at least one of a file or an object.

According to various embodiments, the piece of data may correspond to a portion of at least one of a file or an object.

According to various embodiments, the multi-level data storage device of claim 106, may further include a level reconstruction circuit (not shown in FIG. 1D) configured to reconstruct the level to which the piece of data is associated after loss of information on the level to which the piece of data is associated.

According to various embodiments, the level reconstruction circuit may be configured to reconstruct the level based on metadata associated with the file.

According to various embodiments, a multi-level data storage device, for example a hybrid active storage device, may include multiple types of storage media (for example a NVRAM device, a SSD, and a hard disk drive). The hard drive may be the backend storage device, the NVRAM may be the level 1 cache, and the SSD may be the level 2 cache. The hottest files may be promoted to the level 1 NVRAM cache, other hot files and newly created files may be in the level 2 SSD cache, and the cold files may be demoted to the backend hard drive. When the files in the backend hard drive become hot again, they may be efficiently identified and promoted back to the level 2 and level 1 cache.

It will be understood that although some embodiments for devices, systems, architectures and methods are described with reference to a two-level cache, various embodiments may be applied to more-level caches (in other words: caches with more than two levels).

According to various embodiments, a multi-level cache method may be provided to manage the multi-level cache, controlling the file promotion and demotion between different levels of cache.

According to various embodiments, a footprint tracking method may be provided to efficiently identify the frequently accessed hot files in the backend storage, and promote them into the cache.

According to various embodiments, a failure recovery method may be provided to efficiently rebuild the in-memory multi-level cache list after system crash or power failure, without backing up the cache list to persistent storage.

Figure 2:
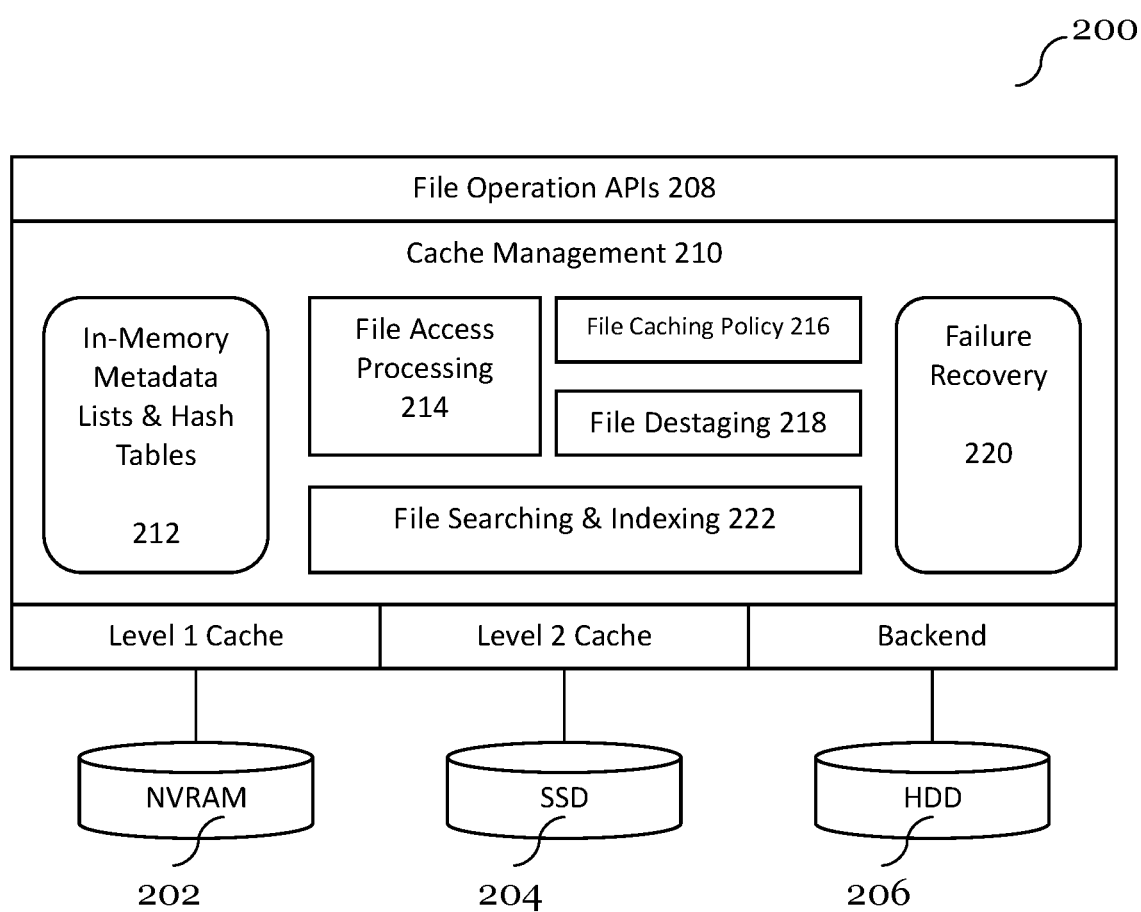
FIG. 2 shows an architecture according to various embodiments.

FIG. 2 shows an overall system architecture 200 of a multi-level cache for a hybrid storage device according to various embodiments. A cache management module 210 may provide traditional file operation APIs 208 to the upper layer, and may thus require no change to the storage system client. The cache architecture may include of a level 1 NVRAM cache 202, level 2 SSD cache 204, and a backend hard disk drive 206. The cache management module 210 may maintain several in-memory metadata lists and hash tables 212. These metadata structures may record the file locations and their access information in the cache 202/204 and the backend 206. The file access processing module 214 may rely on the metadata structures to locate a file when accessing the file. The file caching policy module 216 and the file destaging module 218 may also rely on the metadata structures to identify which files to be promoted into or demote from cache 202/204.

A failure recovery module 220 may be responsible to rebuild the in-memory cache lists for the cache after system crash or power failure. In a traditional method, the in-memory structures may need to be periodically backed up in the persistent storage so as to be rebuilt after system reboot. The backing up operations may take additional system resources. According to various embodiments, it may not be necessary to back up the in-memory structures; instead, use may be made of the local file system in cache to rebuild the multi-level cache list in the memory. By scanning through the files in file systems in level 1 NVRAM cache 202 and level 2 SSD cache 204 (for example by file searching and indexing module 222), all the file entries in the multi-level cache list may be recovered. Moreover, by sorting the file entries according to their access time in the file system metadata, the sequence of the file entries in the multi-level cache list may further be adjusted to better represent the recent access order of the files just before reboot.

Figure 3:
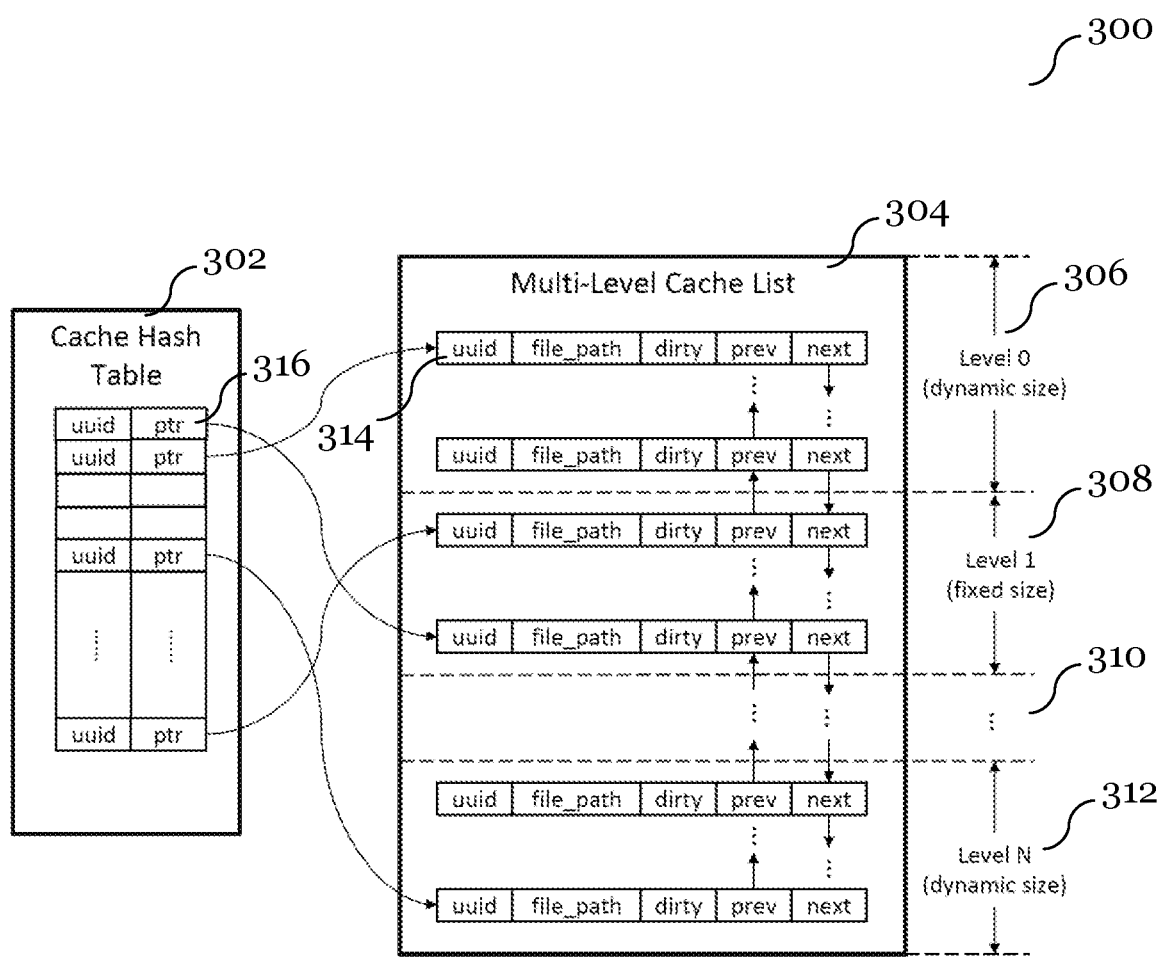
FIG. 3 shows a multi-level cache list for level 1 cache and level 2 cache according to various embodiments.

FIG. 3 shows an illustration 300 of a multi-level cache list 304 and hash table structures 302 to manage the level 1 NVRAM cache and level 2 SSD cache according to various embodiments. Each file may be assigned a unique uuid at its creation time. Each file entry 314 in the list contains the file uuid, path name and a field indicating whether the file has been updated in the cache (i.e., dirty). The hash table is set up to accelerate the lookup of a file's file entry by its uuid. The hash table key 316 may be the file's uuid and the value is the pointer pointing to the file's file entry.

Figure 4:
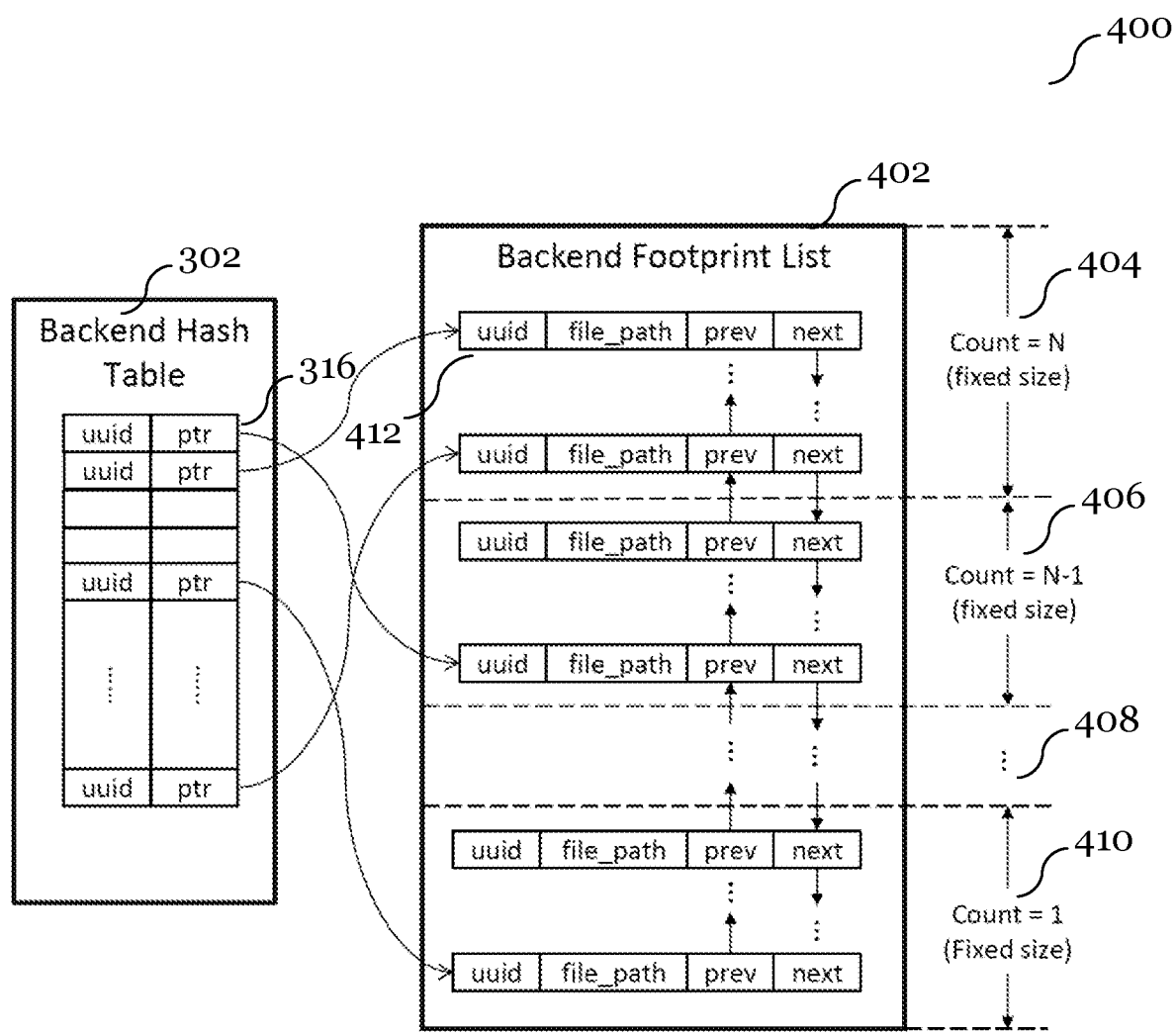
FIG. 4 shows a footprint list for tracking backend accesses according to various embodiments.

The multi-level cache list may include N+1 levels, namely, level 0 (denoted by reference sign 306 in FIG. 3) to level N (denoted by reference sign 312 in FIG. 3). Level 0 region stores entries of the files in level 1 NVRAM cache, and level 1 (denoted by reference sign 308) to level N regions (wherein dots 310 represent the levels 2, 3, ... N−1) store entries of the files in level 2 SSD cache. Each region in the list may be an independent sub-list. Level 0 region 306 may be a LRU (least recently used) list, while level 1 (308) to level N (312) each may be a FIFO (first in first out) list. When a file in the level 0 region 306 is accessed, its entry may be moved to the front of the level 0 region 306 sub-list. When a file in level 1 (308) to level N (312) is accessed, its entry may be moved to the head of the above region. For example, if a file in level i was accessed, it entry may be moved to the front of the level i−1 region. If a file's file entry is moved into the level 0 region 306 from other region, the file will be promoted from level 2 SSD cache into level 1 NVRAM cache. Level 0 region 306 and Level N region 312 may have dynamic-size capacity, meaning that their tail entries may only be moved out of the regions when the free space on NVRAM cache or SSD cache falls under certain pre-defined limit. Level 1 (308) to level N−1 regions (312) have fixed-size capacity, meaning that their tail entries may be moved out of the regions if adding new entries to the front make the total entries exceed the pre-defined maximum number of entries in the regions. For level 0 region 306, its tail entries may be moved to the level N region 312, at the same time, the corresponding files may be demoted from level 1 NVRAM cache to level 2 SSD cache. For level N region 312, its tail entries may be moved to the backend history list (for example list 402 as shown in FIG. 4), and the corresponding files may be demoted from level 2 SSD cache to the backend (for example hard disk drive). For other regions, its tail entries may be moved to the below region, and no file may be moved.

FIG. 4 shows an illustration 400 of a footprint list 402 to record the recent access history of the files in the backend hard disk drive according to various embodiments. Similar like the multi-level cache list 304 shown in FIG. 3, the footprint list 402 may be a multi-level list containing N sub-lists. Each sub-list may be a fixed-size FIFO region. When a file is accessed for the first time in the backend, its footprint entry 412 may be added in the front of the Count=1 region 410. Subsequently, when this file is accessed one more time, its footprint entry 412 may be moved one level up, until to the Count=N region 404. Furthermore, Count=N−1 region 406 and dots 408, indicating the regions between Count=1 region 410 and Count=N−1 region 406 (for example Count=2 region, Count=3 region, . . . Count=N−2 region) are shown. One more access to the file in the Count=N region 404 may bring the file from backend into the SSD cache. On the other hand, if a file in the footprint list 402 is never accessed again, its file entry may be gradually moved down through the list (for example due to each region being managed according to a FIFO procedure), and at last will may evicted from the tail of the list.

Figure 5:
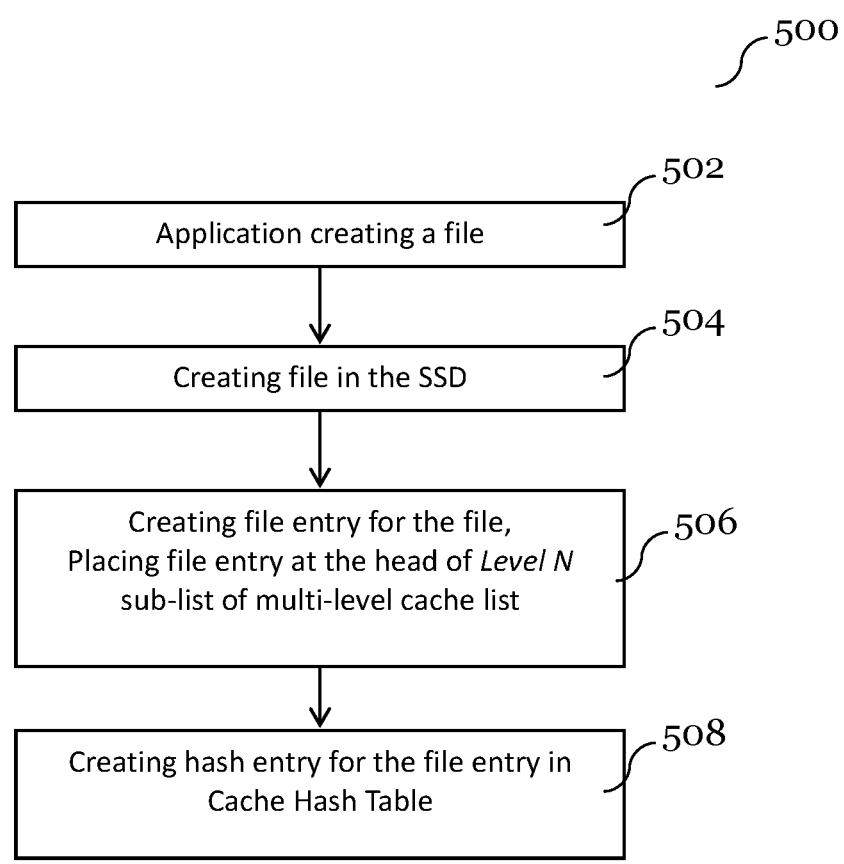
FIG. 5 shows a flow diagram illustrating a process of creating a new file according to various embodiments.

FIG. 5 shows a flow diagram 500 illustrating the process flow of creating/writing a new file to the hybrid active storage device according to various embodiments. In 502, an application is creating a file. A new file may always be created in the Level 2 SSD cache, in 504. After a new file is created, in 506, a file entry may be created for the file, and the entry will be placed at the front of the Level N region of the cache list. Then, in 508, a hash entry for the new file entry may be created in the hash table, enabling quick lookups of the file entry in subsequent operations.

Figure 6:
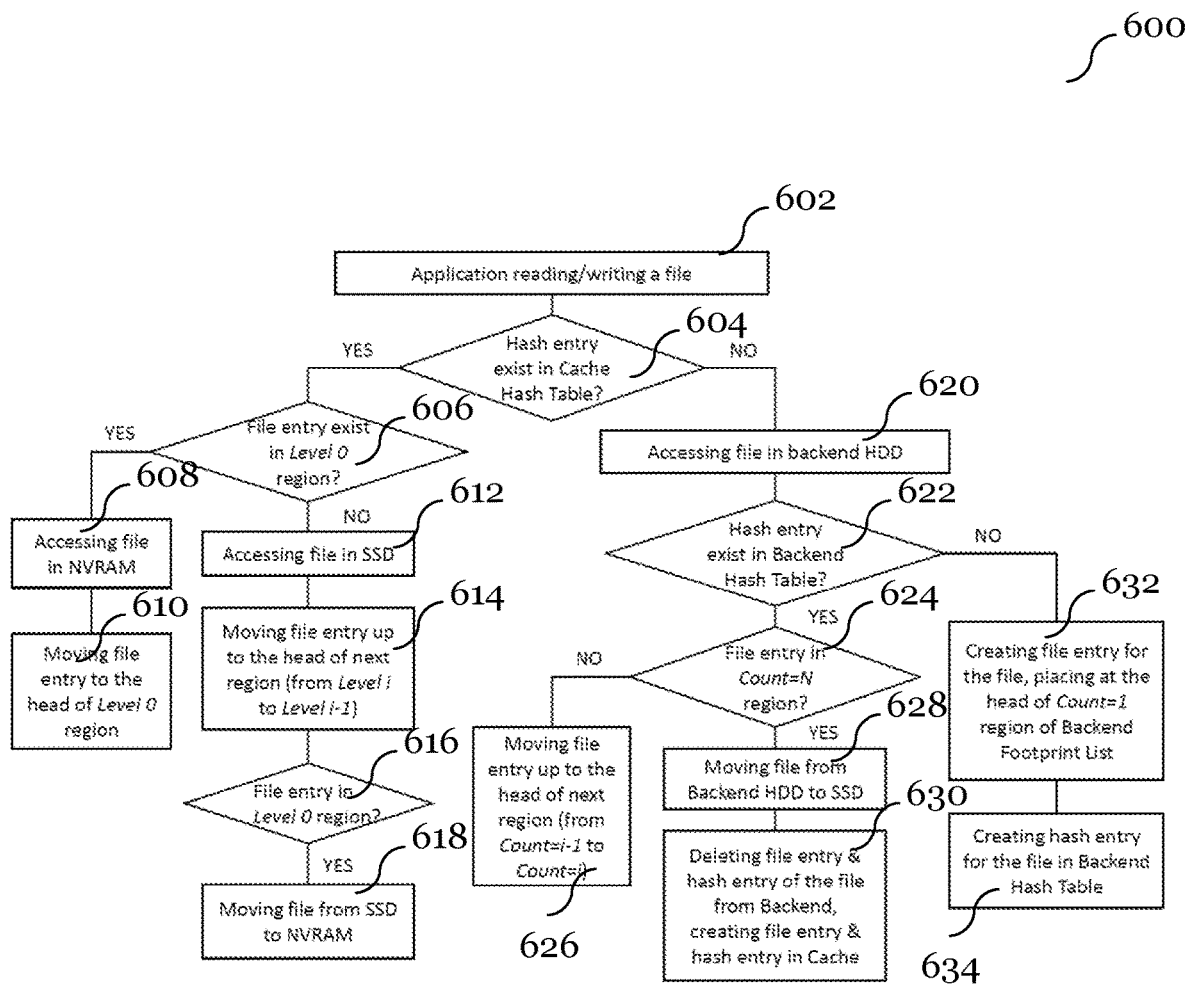
FIG. 6 shows a flow diagram illustrating a process of accessing/caching an existing file according to various embodiments.

FIG. 6 shows a flow diagram 600 illustrating the process flow of accessing and caching an existing file in the hybrid active storage device (and doing the caching under proper conditions) according to various embodiments. File caching may happen when the file access meets the caching conditions (which may be referred to as the "proper conditions"). As shown in FIG. 6, when the file access meets condition in 616, the file caching that moves file from the SSD to NVRAM may happen as illustrated in 618. When file access meets the condition in 624, the file caching that moves file from backend HDD to SSD may happen in 628. When accessing a file (for example an application reading/writing a file, in 602), the cache controller may first to determine where the file is. By looking up the file uuid in the cache hash table, in 604, the cache controller may find its file entry if the file is in the cache (determination of "yes" in 604), and subsequently may access the file from the cache. Otherwise, if the file is not in the cache (determination of "no" in 604), the cache hash table lookup may fail and the cache controller may access the file from the backend, in 620.

If it is determined in 604 that a hash entry exists in the cash hash table, processing may proceed in 606. If it is determined in 604 that a hash entry does not exist in the cash hash table, processing may proceed in 620. In 606, it may be determined whether a file entry exists in level 0 region. If it is determined in 606 that a file entry exists in level 0 region, processing may proceed in 608. If it is determined in 606 that a file entry does not exist in level 0 region, processing may proceed in 612. In 608, the file may be accessed in NVRAM, and processing may proceed in 610. In 610, the file entry may be moved to the head of level 0 region. In 612, the file may be accessed in the SSD, and processing may proceed in 614. In 614, the file entry may be moved up to the head of the next region (for example from level i to level i−1), and processing may proceed in 616. In 616, it may be determined whether the file entry is in level 0 region. If it is determined in 616 that the file entry is in level 0 region, the file may be moved from SSD to NVRAM in 618. If it is determined in 616 that the file entry is not in level 0 region, the file may be left in the SSD. In 620, the file may be accessed in the backend HDD, and processing may proceed in 622. In 622, it may be determined whether a hash entry exists in the backend has table. If it is determined in 622, that a hash entry exists in the backend has table, processing may proceed in 624. If it is determined in 622, that a hash entry does not exist in the backend has table, processing may proceed in 632. In 624, it may be determined whether a file entry in Count=N region exists. If it is determined in 624, that a file entry in Count=N region exists, processing may proceed in 628. If it is determined in 624, that a file entry in Count=N region does not exist, processing may proceed in 626. In 626, the file entry may be moved up to the head of the next region (from Count=i−1 region to Count=i region). In 628, the file may be moved from backend HDD to SSD, and processing may proceed in 630. In 630, the file entry and hash entry may be deleted from the backend, and a file entry and hash entry may be created in the cache. In 632, a file entry for the file may be created, and may be placed at the head of the Count=1 region of the backend footprint list, and processing may proceed in 634. In 634, a hash entry for the file may be created in the backend hash table.

When a file is accessed, the cache list or the backend footprint list may be adjusted accordingly. For example based on the properties of the lists described in FIG. 4 and FIG. 5, the files may be promoted or demoted between the caches and the backend if the conditions are met.

Figure 7:
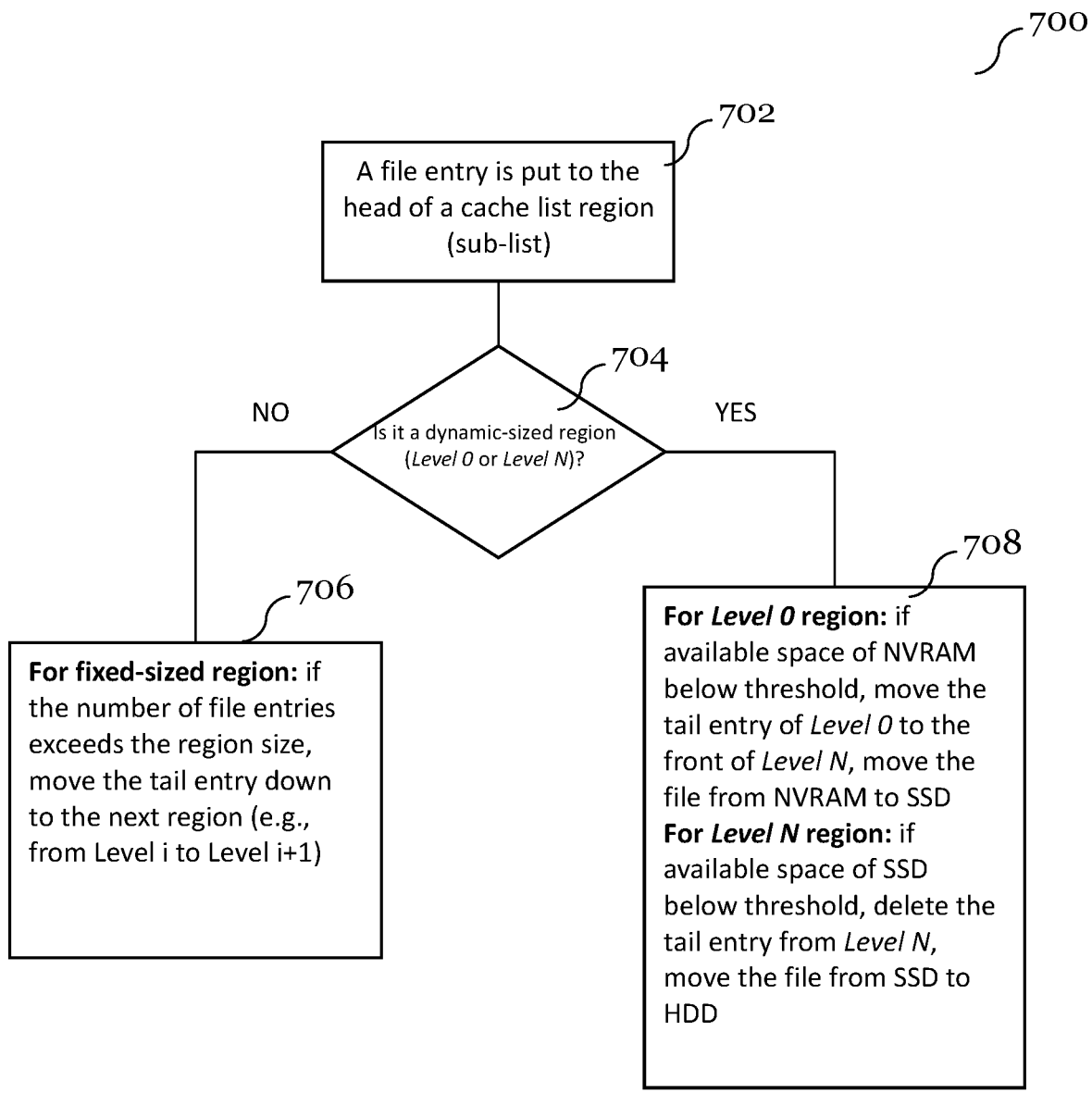
FIG. 7 shows a flow diagram illustrating a process of cache destaging according to various embodiments.

FIG. 7 shows a flow diagram 700 illustrating the process flow of cache destaging (under proper conditions) according to various embodiments. File destaging conditions (which may be referred to as "proper conditions") are shown in 708 in FIG. 7. The conditions are that, for a file in NVRAM, if the available space of NVRAM below threshold, the target file may be destaged to the SSD; for a file in the SSD, if the available space of the SSD is below a threshold, the target file may be destaged to HDD. When the cache list is adjusted, some of the file entries may be moved from one region (sub-list) to another region (sub-list). When a region is added with a new entry (for example in 702, where a file entry is put to the head of a cache list region, in other words, to a sub-list), the cache controller may check if the total number of file entries has exceeded the list capacity. In 704 it may be determined whether the region is a dynamic sized region (in other words: whether the region is level 0 region or level N region). In 708, for level 0 region, the cache controller may check if the free space in NVRAM cache has fallen under predefined limit, if it does, the tail entries in level 0 region may be evicted to the level N region, and the corresponding files may be demoted from NVRAM cache to SSD cache. In 708, for level N region, the cache controller may check if the free space in SSD cache has fallen under a predefined limit, and if it does, the tail entries in level N region may be evicted to the last region in the backend footprint list, and the corresponding files will be demoted from the SSD cache to the backend storage. In 706, for level 1 to level N−1 regions, since they are fixed-size regions, the cache controller may check if the total number of file entries will exceed the predefined maximum number of entries in the region, and if it does, the tail entries may be moved down to the lower region. Since the files are still in the SSD cache, no actual file demotion may happen during this process.

Figure 8:
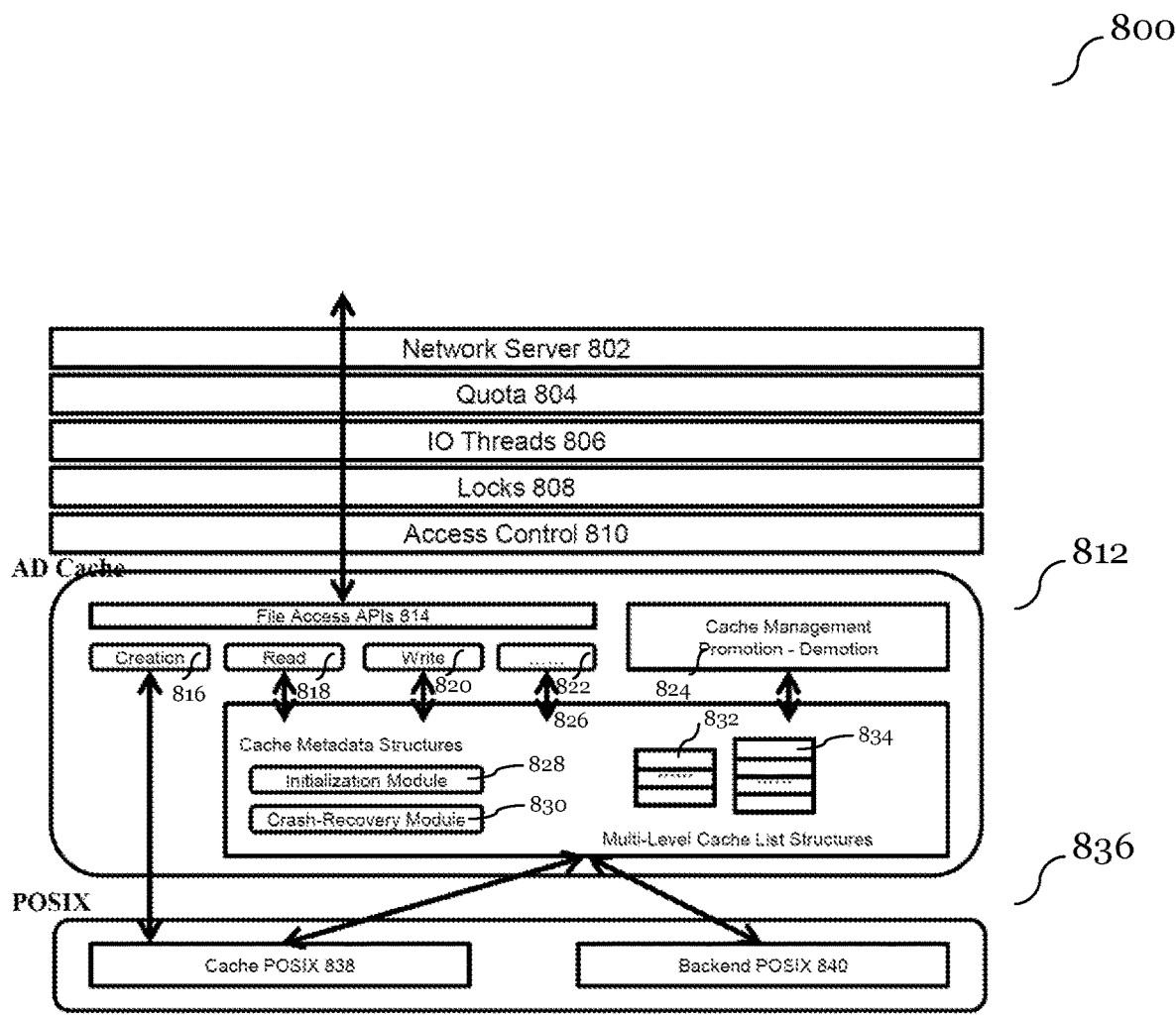
FIG. 8 shows an illustration of the implementation architecture of a cache for an active storage device according to various embodiments.

FIG. 8 shows an illustration 800 of the implementation architecture of a cache for an active storage device (in other words: an AD Cache) according to various embodiments. The AD Cache may be implemented in the GlusterFS platform, as an independent server-side translator. FIG. 8 shows a GlusterFS server-side translator stack. The AD Cache translator 812 may be provided above the GlusterFS POSIX translator 836 (which may include a cache POSIX 838 and a backend POSIX 840). POSIX translator 836 may be the last translator in the GlusterFS translator stack and just on top of the local file system. The AD Cache may be independently added into and removed from the translator stack, through the configuration of the GlusterFS volume files. The AD Cache may work on the unit of a file. Each time, a whole file is cached into the cache devices, or destaged from the cache device to the backend device. The AD cache translator 812 may include file access APIs (application programming interface) 814, a creation module 816, a read module 818, a write module 820, further modules (like indicated by dots 822), a cache management module 824 (for example for promotion and demotion), cache metadata structure 826, an initialization module 828, a crash-recovery module 830, an multi-level cache list structure 832 and 834 (for example like also shown in FIG. 3 and FIG. 4). Above the AD cache translator 812, access control 810, locks 808, IO (input/output) threads 806, quota 804, and a network server 802 may be provided.

In applications where files are big (for example in a virtual machine system, the virtual disks are very large files), the efficiency of AD Cache may be lower compared to applications with a smaller file size.

To solve the problem, the a File Striping translator may be added on top of AD Cache, which breaks a big file into multiple smaller files and store into the AD Cache.

Figure 9:
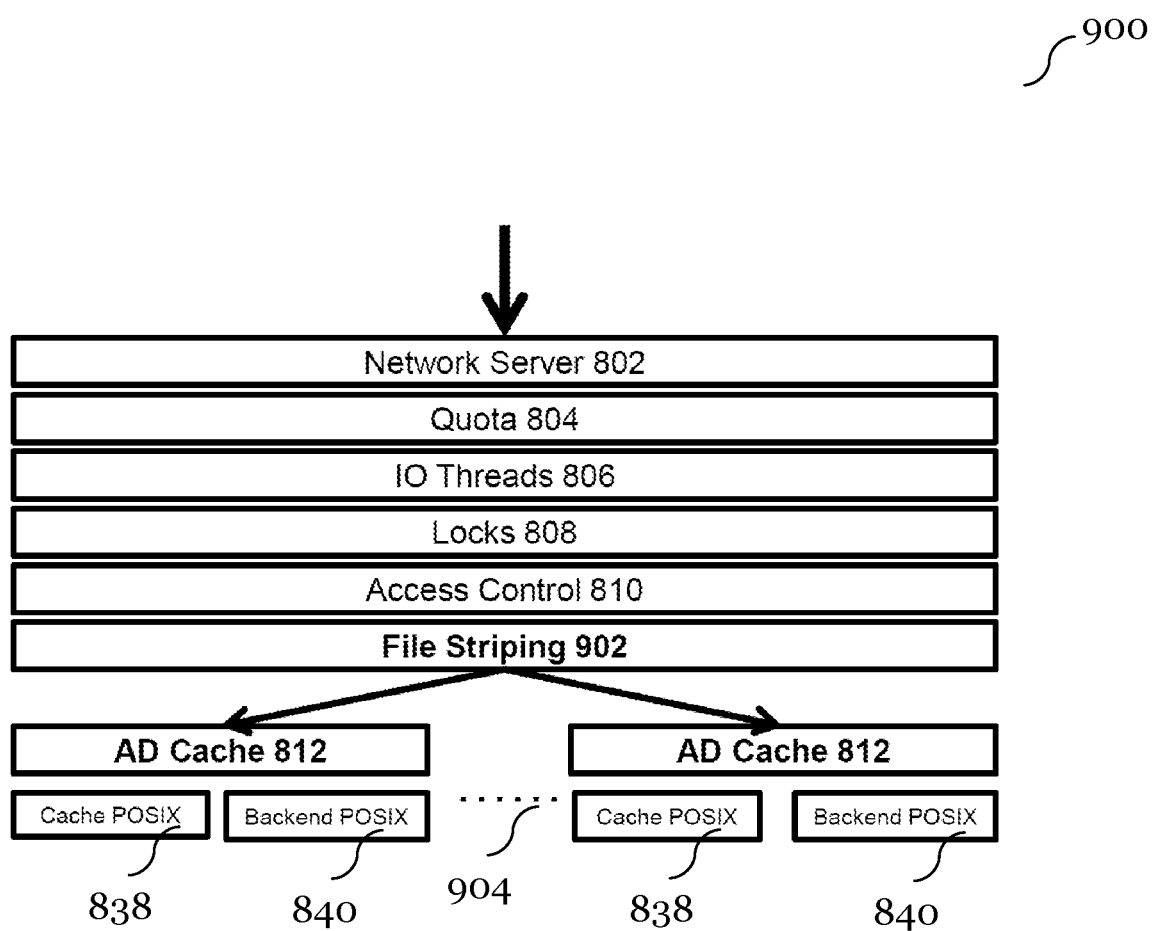
FIG. 9 shows an illustration of an implementation architecture of cache with file striping according to various embodiments.

FIG. 9 shows an illustration 900 of an implementation architecture of AD Cache with file striping according to various embodiments. In some applications, the files may be very big files. For instance, in an OpenStack system, the virtual disk files of the virtual machines may be big files of several GBs. Caching and Destaging on big files may not be efficient for AD Cache, since a big file may occupy a large amount of cache space, and moving a big file between cache and backend devices may take a long time. To solve the problem, a File Striping translator 902 may be provided on top of AD Cache, which may break a big file into multiple smaller files and stores the resulting parts into the AD Cache, so that the AD Cache can cache some of the smaller files instead of the whole big file. The file striping translator 902 may have the similar function like the GlusterFS client-side striping translator shown in FIG. 8. Like indicated by dots 904, a plurality of AD cache translators 812 may be provided.

In the following, performance evaluation results will be described, wherein performance is compared with a Linux cache architecture of B-Cache.

Figure 10A:
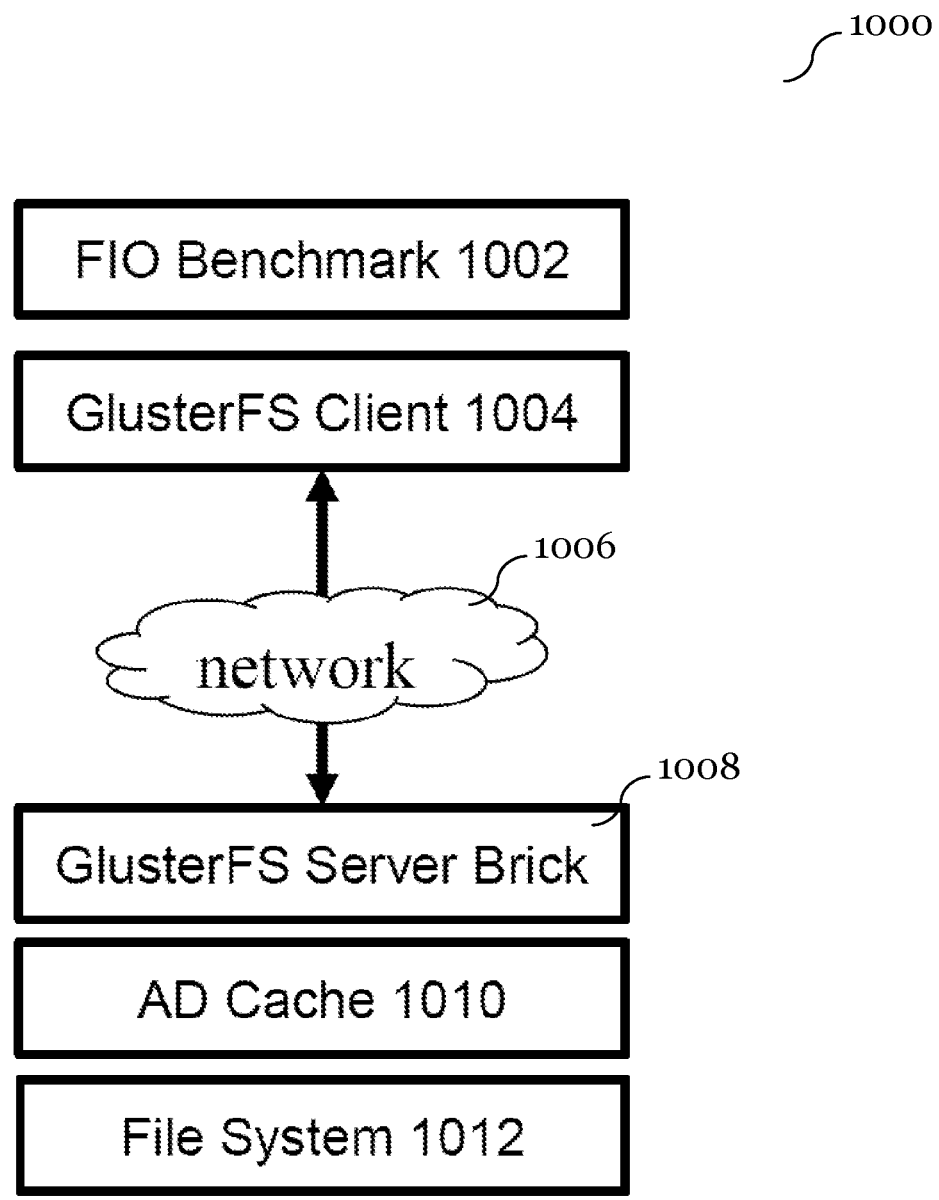
FIG. 10A shows an illustration of a GlusterFS-AC cache setup according to various embodiments.

FIG. 10A shows an illustration 1000 of a GlusterFS-AC cache setup according to various embodiments. A FIO (flexible input/output) benchmark 1002, a GlusterFS client 1004, a network 1006, a GlusterFS server brick 1008, an AD cache 1010 according to various embodiments, and a file system 1012 are provided.

Figure 10B:
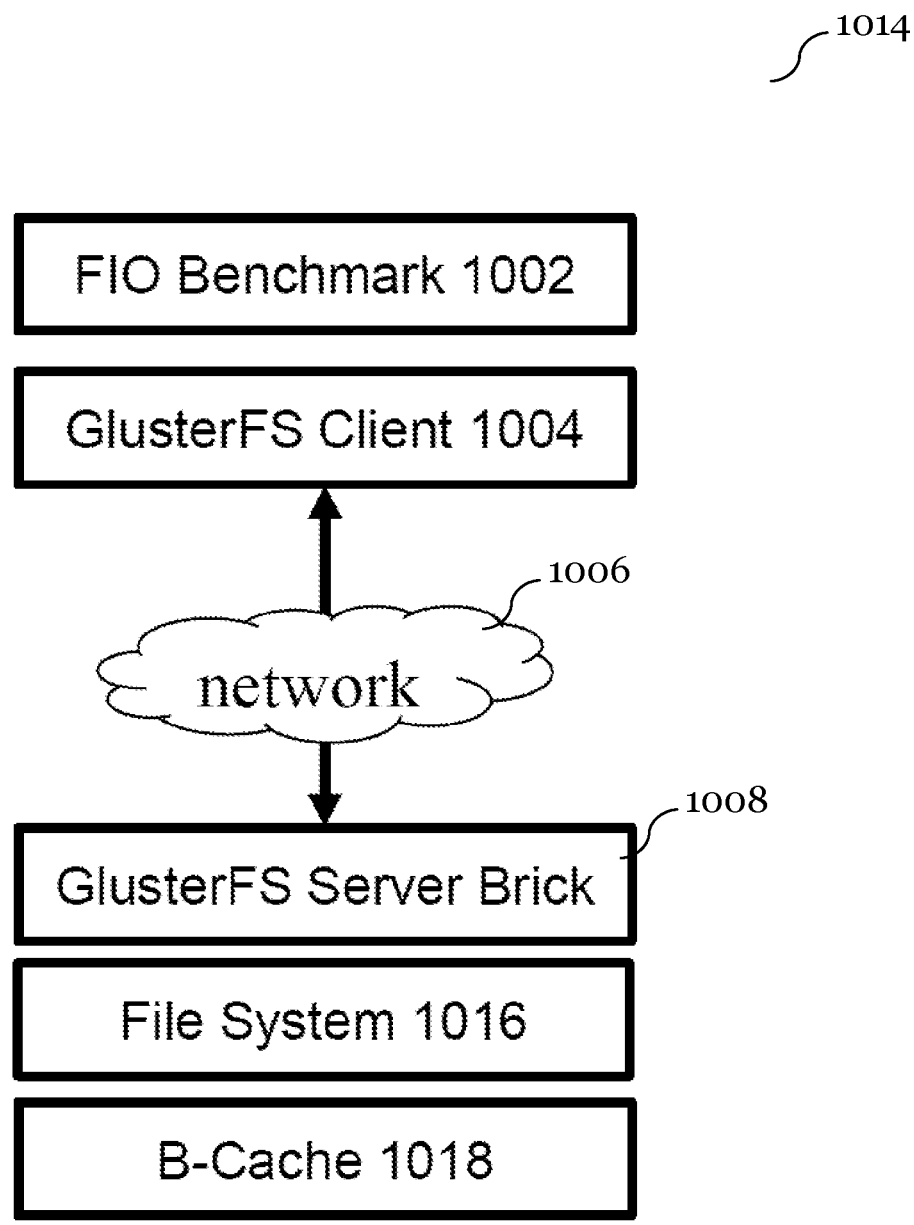
FIG. 10B shows an illustration 1000 of a GlusterFS-B cache setup.

FIG. 10B shows an illustration 1000 of a GlusterFS-B cache setup. A file system 1016 and a B cache 1018 are provided.

Figure 10C:
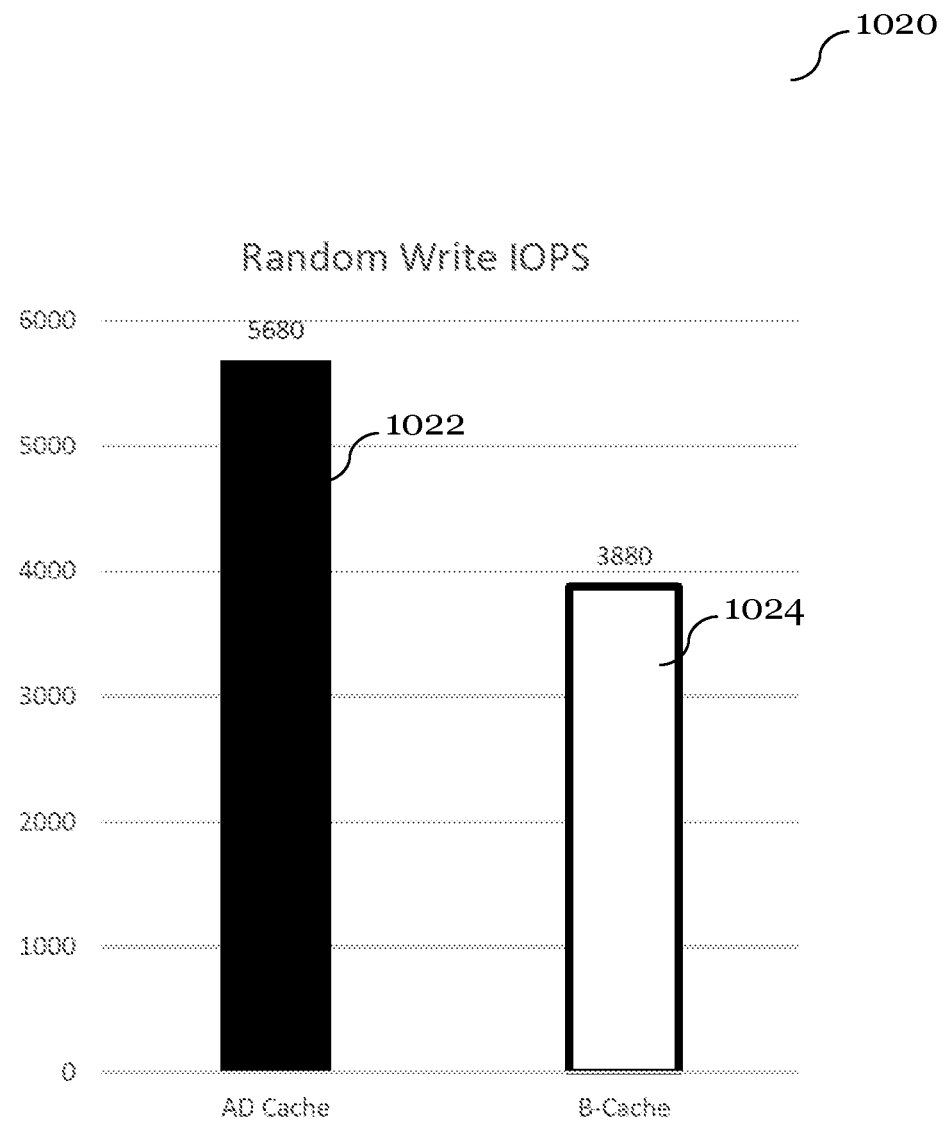
FIG. 10C shows a graph 1020 illustrating performance evaluation results.

FIG. 10C shows a graph 1020 illustrating the number of random write IOPS (input/output operations per second), wherein a first bar 1022 indicates the results for the AD cache according to various embodiments, and a second bar 1024 indicates the results for the B cache.

In the following, performance evaluation results will be described, wherein performance evaluation with a configuration of multiple parallel clients (in other words: mount points) is provided.

Figure 11A:
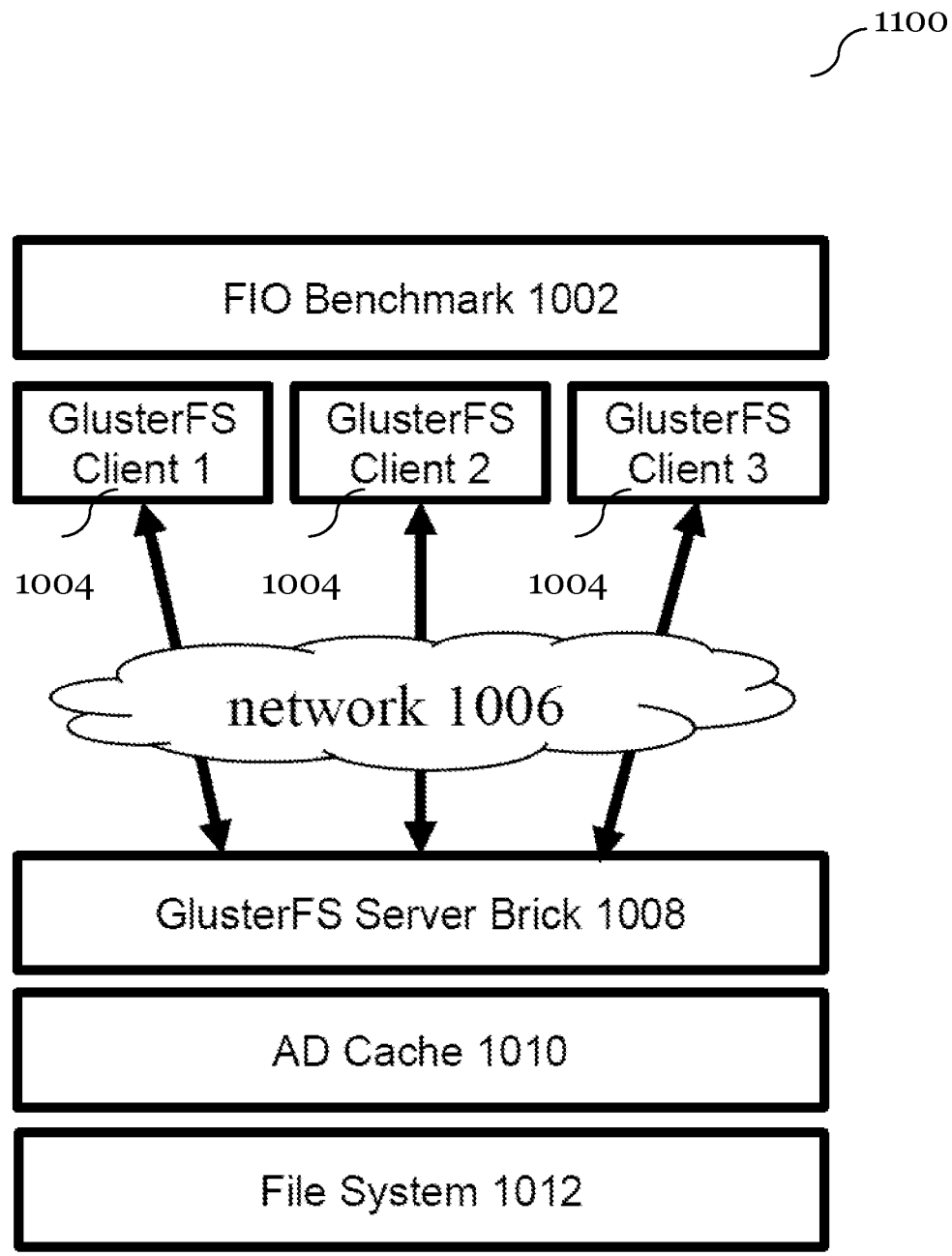
FIG. 11A shows an illustration of a GlusterFS-AC cache setup according to various embodiments.

FIG. 11A shows an illustration 1100 of a GlusterFS-AC cache setup according to various embodiments with a plurality of GlusterFS clients 1004.

Figure 11B:
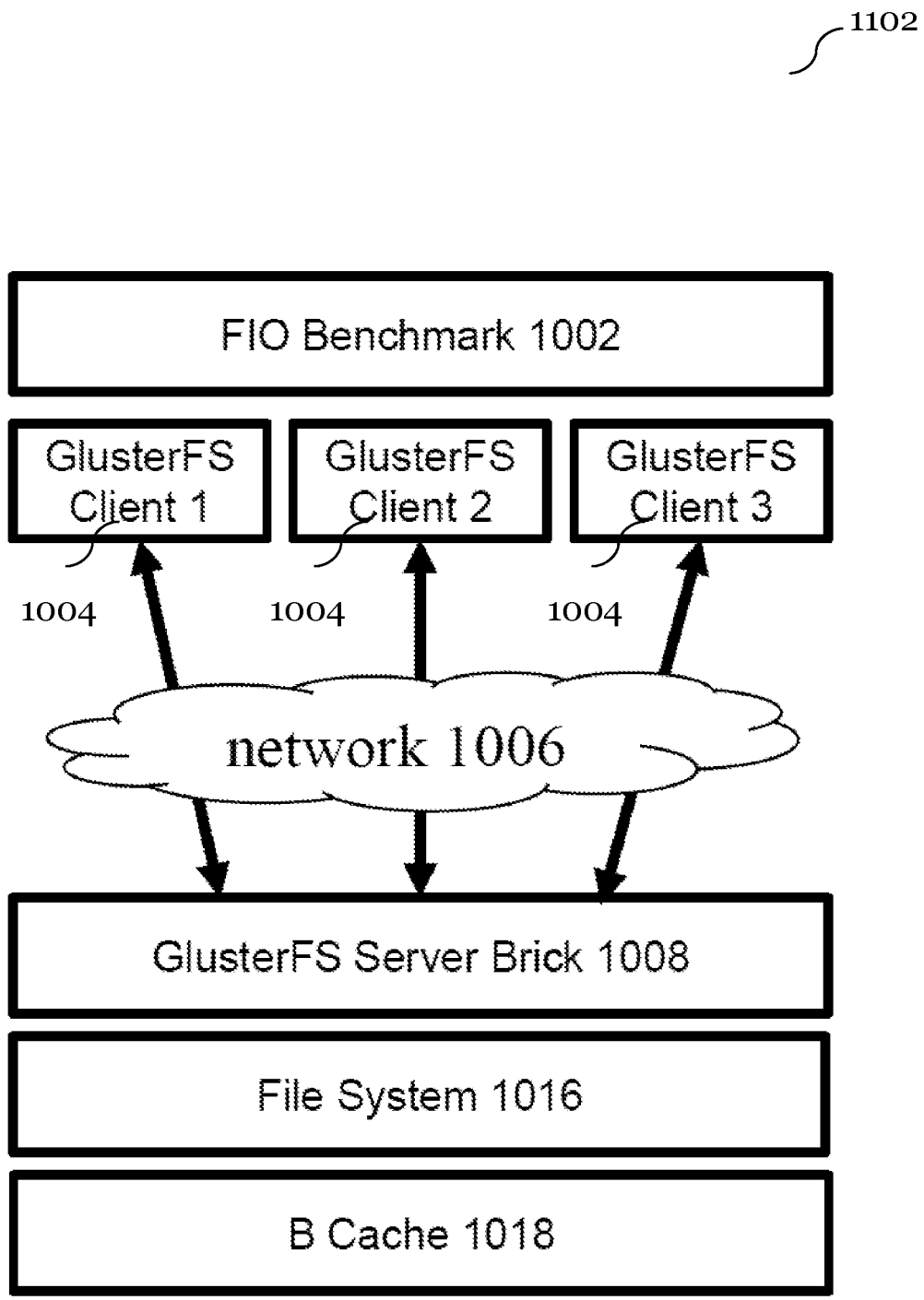
FIG. 11B shows an illustration 1000 of a GlusterFS-B cache setup.

FIG. 11B shows an illustration 1102 of a GlusterFS-B cache setup with a plurality of GlusterFS clients 1004.

Figure 11C:
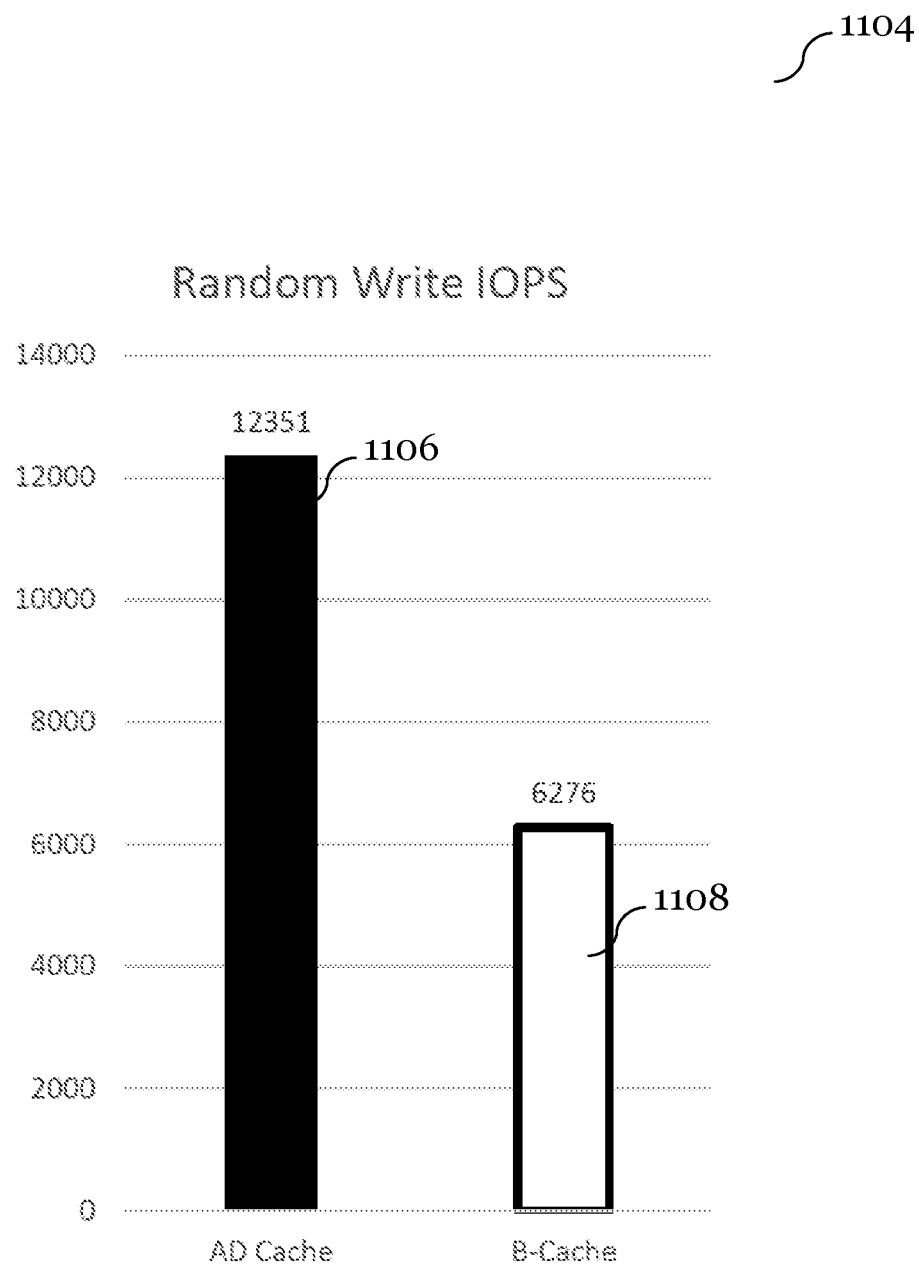
FIG. 11C shows a graph 1020 illustrating performance evaluation results.

FIG. 11C shows a graph 1104 illustrating the number of random write IOPS (input/output operations per second), wherein a first bar 1106 indicates the results for the AD cache according to various embodiments, and a second bar 1108 indicates the results for the B cache.

Figure 12:
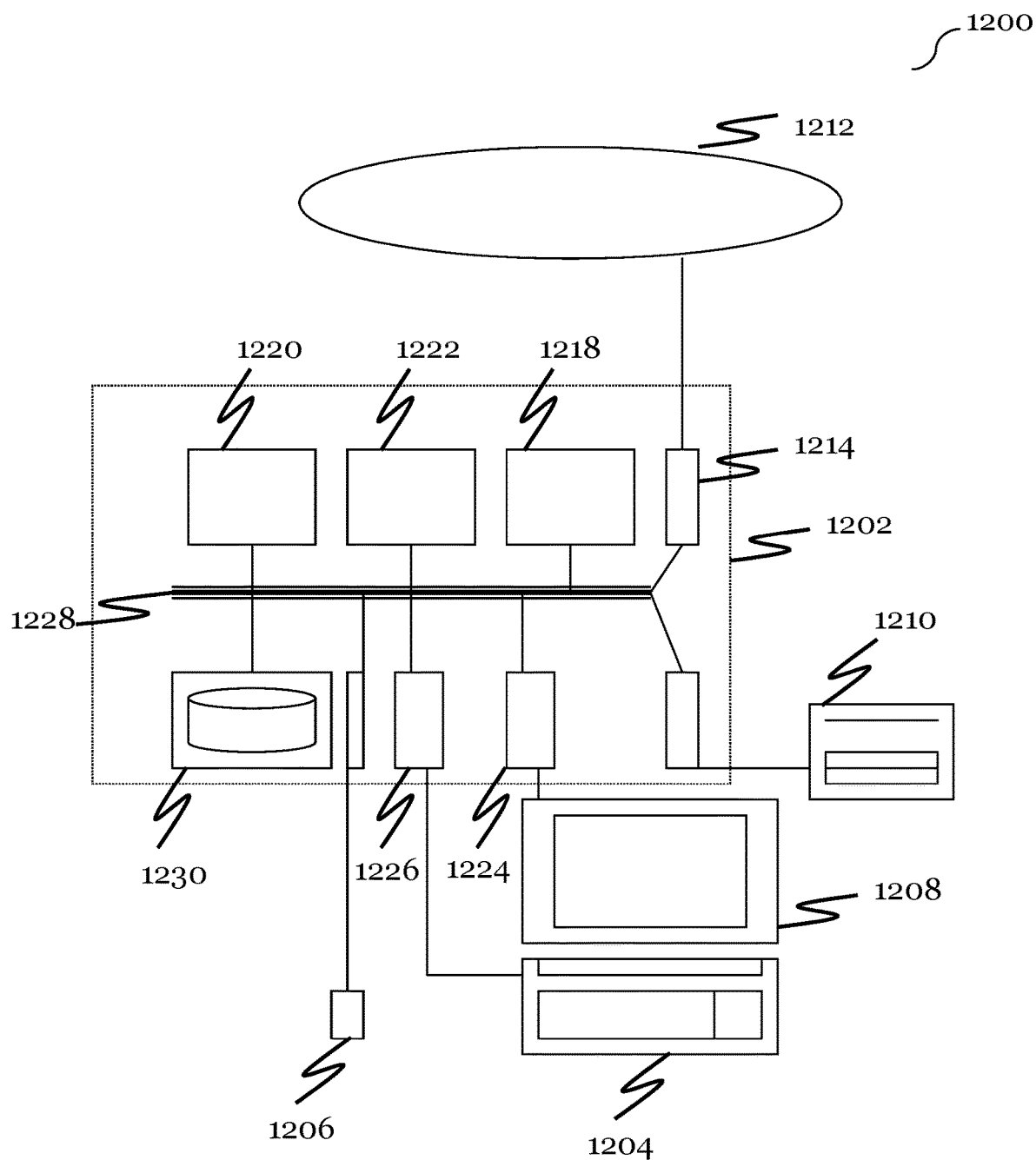
FIG. 12 shows a computer system according to various embodiments.

The multi-level data storage device according to various embodiments may be provided in a computer system 1200, schematically shown in FIG. 12. It may be implemented as software, such as computer programs being executed within the computer system 1200, and instructing the computer system 1200 to conduct the methods of the example embodiments. Similarly, portions of the computer system 1200 may be embodied in the access control device of the example embodiments.

The computer system 1200 may include a computer module 1202, input modules such as a keyboard 1204 and mouse 1206 and a plurality of output devices such as a display 1208, and printer 1210.

The computer module 1202 may be connected to a computer network 1212 via a suitable transceiver device 1214, to enable access to e.g. the Internet or other network systems such as Local Area Network (LAN) or Wide Area Network (WAN).

The computer module 1202 in the example may include a processor 1218, a Random Access Memory (RAM) 1220 and a Read Only Memory (ROM) 1222. The computer module 1202 may also include a number of Input/Output (I/O) interfaces, for example I/O interface 1224 to the display 1208, and I/O interface 1226 to the keyboard 1204. The components of the computer module 1202 may communicate via an interconnected bus 1228 and in a manner known to the person skilled in the relevant art.

The application program may be supplied to the user of the computer system 1200 encoded on a data storage medium such as a CD-ROM or flash memory carrier and may be read utilizing a corresponding data storage medium drive of a data storage device 1230. The application program may be read and controlled in its execution by the processor 1218. Intermediate storage of program data may be accomplished using RAM 1220.

According to various embodiments, a cache architecture may be provided which includes multiple levels (in other words: a plurality of levels, for example three or more levels) of cache devices and may efficiently manage different types of storage media (e.g., NVRAM, SSD and HDD) inside the hybrid storage device.

According to various embodiments, a multi-level cache method may efficiently identify the file hotness in different levels of cache, and may control the file promotion and demotion between different levels of cache and the backend accordingly.

In order to quantify the file hotness, an access counter may be used to record the total access times. The access counter may record all the history access information during the past period of time, but may not accurately reflect the real-time hotness of a file relative to other files. Moreover, in order to identify the hottest files, one needs to search and sort all the files in the list. According to various embodiments, a multi-level footprint list may be used instead of the access counter to record the access information of the files. This method may more accurately identify the real-time hotness of the files, and may directly identify the hottest files in the list.

According to various embodiments, the in-memory lists and structures of cache may not be backed up. A method of scanning the cache file system and using the file system metadata may be used to rebuild the cache list. According to various embodiments, in a system that has NVRAM used as system memory, the in-memory lists and structures may also be stored in the NVRAM to make them persistent against power failures or system crashes.

According to various embodiments, devices and methods may be provided to efficiently manage hybrid storage devices.

According to various embodiments, hardware architectures for active storage clusters may be provided. According to various embodiments, storage server functions may be provided in a storage device. According to various embodiments, storage devices may be provided which may connect directly to Ethernet, and may eliminate server hardware components.

According to various embodiments, devices and methods may be provided for highly scalable and reliable storage clusters (for example Ceph or GlusterFS).

According to various embodiments, a multi-level data storage device may include: a first storage; a second storage; an access determination circuit configured to determine that access is made to a piece of data stored on the first storage, the piece of data associated with a level; a level management circuit configured to change the level to which the piece of data is associated upon determination that access is made to the piece of data and configured to change the level to which the piece of data is associated if a number of other pieces of data associated with the level is higher than a pre-determined threshold; a storage controller configured to effect storing of the piece of data on the second storage if the level includes (or is or is included in) a pre-determined level and configured to remain the piece of data stored on the first storage if the level is (or includes or is included in) a level in a pre-determined set of a plurality of levels.

According to various embodiments, a multi-level data storage device may include: a first storage; a second storage; a level management circuit configured to manage for each piece of data stored on at least one of the first storage or the second storage a level information, wherein the level information is (or includes or is included in) at least a first level, a second level, and a third level; an access determination circuit configured to determine that access is made to a piece of data stored on at least one of the first storage or the second storage; wherein the level management circuit is configured to decrease the level to which the piece of data is associated upon determination that access is made to the piece of data and increase the level to which the piece of data is associated if a number of other pieces of data associated with the level is higher than a pre-determined threshold; a target determination circuit configured to determine a target storage from the plurality of storages on which to store the piece of data based on the level of the entry corresponding to the piece of data; and a storage controller configured to effect storing of the piece of data on the determined target storage.

A multi-level data storage device may include: a plurality of storages; an access determination circuit configured to determine that access is made to a piece of data stored on a storage of the plurality of storages, the piece of data associated with a level; a level management circuit configured to change the level to which the piece of data is associated upon determination that access is made to the piece of data and configured to change the level to which the piece of data is associated if a number of other pieces of data associated with the level is higher than a pre-determined threshold; a target determination circuit configured to determine a target storage from the plurality of storages on which to store the piece of data based on the level of the entry corresponding to the piece of data; and a storage controller configured to effect storing of the piece of data on the determined target storage.

While exemplary embodiments have been presented in the foregoing detailed description of the invention, it should be appreciated that a vast number of variations exist.

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of elements and method of operation described in an exemplary embodiment without departing from the scope of the invention as set forth in the appended claims.

What is claimed is:

1. A control module for a multi-level data storage device having a plurality of memory devices, the control module comprising:
   an access determination circuit configured to determine that access has been made to a piece of data stored on at least one of the plurality of memory devices, the piece of data associated with a level comprising one of a first level, a second level, or a third level;
   a level management circuit configured to change the level from the third level to the second level or from the second level to the first level upon determining that access has been made to the piece of data;
   a memory controller configured to promote the piece of data in response to whether the level comprises the first level, the second level or the third level, wherein at least two levels of the first level, the second level, and the third level are associated with one of the plurality of memory devices; and
   a level reconstruction circuit configured to reconstruct the level to which the piece of data is associated after loss of information on the level to which the piece of data is associated; wherein the level reconstruction circuit is configured to reconstruct the level based on metadata associated with the file.

2. The control module of claim 1,
   wherein a first memory device of the plurality of memory devices is associated with the first level; and
   wherein a second memory device of the plurality of memory devices is associated with the second level and the third level.

3. The control module of claim 1,
   wherein a first memory device of the plurality of memory devices is associated with the first level and the second level; and
   wherein a second memory device of the plurality of memory devices is associated with the third level.

4. The control module of claim 1,
wherein the memory controller is configured to delete the piece of data from a previous storage location after promoting the piece of data.

5. The control module of claim 1,
wherein the memory controller is configured to maintain storing the piece of data on a previous storage location after promoting the piece of data.

6. The control module of claim 1,
wherein the memory controller is configured to demote the piece of data if a number of other pieces of data associated with the same level as the piece of data is higher than a pre-determined threshold.

7. The control module of claim 6,
wherein demoting the piece of data comprises changing the level that the piece of data is associated with to a pre-determined level.

8. The control module of claim 6,
wherein the memory controller is configured to delete the piece of data from a previous storage location after demoting the piece of data.

9. The control module of claim 1,
wherein each memory device of the plurality of memory devices is associated with a plurality of levels.

10. The control module of claim 9,
wherein each level of the plurality of levels is associated with only one memory device.

11. A computer readable medium comprising instructions which, when executed by a processor, make the processor perform a multi-level data storage method, the multi-level data storage method comprising:
   determining that access has been made to a piece of data stored on at least one of a plurality of memory devices, the piece of data associated with a level comprising one of a first level, a second level, or a third level;
   changing the level from the third level to the second level or from the second level to the first level upon determining that access has been made to the piece of data;
   promoting the piece of data in response to whether the level comprises the first level, the second level or the third level, wherein at least two levels of the first level, the second level, and the third level are associated with one of the plurality of memory devices; and
   reconstructing, based on metadata associated with the file, the level to which the piece of data is associated after loss of information on the level to which the piece of data is associated.

12. A multi-level data storage device comprising:
   a plurality of memory devices;
   an access determination circuit configured to determine that access has been made to a piece of data stored on at least one of the plurality of memory devices, the piece of data associated with a level comprising one of a first level, a second level, or a third level;
   a level management circuit configured to change the level from the third level to the second level or from the second level to the first level upon determining that access has been made to the piece of data; and
   a memory controller configured to promote the piece of data in response to whether the level comprises the first level, the second level or the third level, wherein at least two levels of the first level, the second level, and the third level are associated with one of the plurality of memory devices; and
   a level reconstruction circuit configured to reconstruct, based on metadata associated with the file, the level to which the piece of data is associated after loss of information on the level to which the piece of data is associated.

13. The multi-level data storage device of claim 12,
wherein the plurality of memory devices comprises memory devices of different speed.

14. The multi-level data storage device of claim 13,
wherein promoting the piece of data comprises storing the piece of data on a faster memory device.

15. The multi-level data storage device of claim 12,
wherein the plurality of memory devices comprises a hard disk drive, a solid-state drive and a non-volatile random access memory.

16. The multi-level data storage device of claim 15,
wherein promoting the piece of data comprises copying the piece of data from the hard disk drive to the solid-state drive or copying the piece of data from the solid-state drive to the non-volatile random access memory.

* * * * *